(12) United States Patent
Miyoshi et al.

(10) Patent No.: US 11,283,100 B2
(45) Date of Patent: Mar. 22, 2022

(54) BATTERY DEVICE WITH HEAT EXCHANGE HOUSING CONFIGURATION

(71) Applicant: Honda Motor Co., Ltd., Tokyo (JP)

(72) Inventors: Kyosuke Miyoshi, Saitama (JP); Yoshiatsu Asai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 16/512,390

(22) Filed: Jul. 16, 2019

(65) Prior Publication Data

US 2020/0028202 A1 Jan. 23, 2020

(30) Foreign Application Priority Data

Jul. 17, 2018 (JP) .............................. JP2018-134209

(51) Int. Cl.
  *H01M 50/204* (2021.01)
  *H01M 10/04* (2006.01)
  *H01M 10/655* (2014.01)
  *H01M 50/20* (2021.01)

(52) U.S. Cl.
  CPC ..... *H01M 10/0481* (2013.01); *H01M 10/655* (2015.04); *H01M 50/20* (2021.01); *H01M 2220/20* (2013.01)

(58) Field of Classification Search
  None
  See application file for complete search history.

(56) References Cited

U.S. PATENT DOCUMENTS

2014/0220410 A1* 8/2014 Maguire ........... H01M 10/6557
                                                          429/142
2019/0214690 A1* 7/2019 Haussmann ........ H01M 10/613

FOREIGN PATENT DOCUMENTS

| CN | 102782931 | 11/2012 |
|----|-----------|---------|
| CN | 102856516 | 1/2013 |
| JP | 2006286357 | 10/2006 |
| JP | 2008108651 | 5/2008 |
| JP | 2011034775 | 2/2011 |
| JP | 2011171029 | 9/2011 |
| JP | 2012146403 | 8/2012 |

(Continued)

OTHER PUBLICATIONS

English translation of JP2006286357 (Year: 2006).*
(Continued)

*Primary Examiner* — Lucas J. O'Donnell
(74) *Attorney, Agent, or Firm* — JCIPRNET

(57) ABSTRACT

A battery device includes: an exterior body having two outer side walls; a battery cell group configured by stacking battery cells each having an electrode terminal; temperature control medium flow paths provided inside the outer side walls; and a holding mechanism applying a pressure on the battery cell group in a direction of pressing the battery cell group toward the outer side wall, and holding the battery cell group. The battery cell has the electrode terminal on the upper portion. The battery cell group has a convex part protruding toward the outer side wall on a lower portion. An inner surface of the outer side wall has a concave part along the length direction of the exterior body at a lower position than the temperature control medium flow path. The battery cell group is held by the holding mechanism through engagement of the convex part and the concave part.

20 Claims, 22 Drawing Sheets

(56) References Cited

FOREIGN PATENT DOCUMENTS

| JP | 2013069657 | 4/2013 |
| JP | 2016091951 | 5/2016 |
| JP | 2016184470 | 10/2016 |
| JP | 2017220422 | 12/2017 |

OTHER PUBLICATIONS

"Office Action of China Counterpart Application" with English translation thereof, dated Nov. 15, 2021, p. 1-p. 10.
"Office Action of Japan Counterpart Application" with English translation thereof, dated Nov. 30, 2021, p. 1-p. 10.

* cited by examiner

BATTERY DEVICE WITH HEAT EXCHANGE HOUSING CONFIGURATION

CROSS-REFERENCE TO RELATED APPLICATION

This application claims the priority benefit of Japan Application No. 2018-134209, filed on Jul. 17, 2018. The entirety of the above-mentioned patent application is hereby incorporated by reference herein and made a part of this specification.

BACKGROUND

Technical Field

The disclosure relates to a battery device.

Description of Related Art

A hybrid car or an electric car is equipped with a battery device having a plurality of battery cells such as a lithium ion secondary battery. Generally, these vehicles require more power than ordinary gasoline vehicles, so it is required to install as many battery cells as possible in a high density in a limited space.

There is a conventional battery device, which stacks and houses a plurality of battery cells in a case body that has a bottom plate, a pair of side plates, and an end plate, wherein a pair of guide grooves that face each other is formed on the upper portions of the inner surfaces of the side plates, and electrode terminals of the battery cells that protrude to the upper two side surfaces are housed in the guide grooves and electrically connected to the connection terminals in the guide grooves (see Patent Document 1, for example).

For the battery device, it is necessary to position the stacked battery cells at fixed positions so that they do not rattle due to vibration of the vehicle, and to efficiently cool the battery cells. In particular, because the battery cells have the highest temperature near the electrode terminals, it is necessary to position them to bring the upper sides of the battery cells, on which the electrode terminals protrude, into contact with the heat exchange surface for heat exchange, and to maintain the contact state.

However, Patent Document 1 does not disclose bringing the areas near the electrode terminals of the battery cells into contact with the heat exchange surface for heat exchange, or positioning the battery cells to maintain the contact state.

RELATED ART

Patent Document

[Patent Document 1] Japanese Laid-Open No. 2006-286357

SUMMARY

A battery device according to the disclosure is a battery device (for example, the battery device 1 described later), including: an exterior body (for example, the exterior body 30 described later) including two outer side walls (for example, the outer side walls 33 described later); at least one battery cell group (for example, the battery cell group 6 described later) housed between the two outer side walls of the exterior body and configured by stacking a plurality of battery cells (for example, the battery cells 60 described later) each having an electrode terminal (for example, the electrode terminal 602 described later) on an upper portion; a temperature control medium flow path (for example, the temperature control medium flow path 36 described later) provided inside at least one of the two outer side walls (for example, the outer side walls 33 described later), wherein a temperature control medium for exchanging heat with the battery cells flows in the temperature control medium flow path; and a holding mechanism (for example, the holding mechanism 7 described later) applying a pressure on the battery cell group in a direction of pressing the battery cell group toward the outer side wall provided with the temperature control medium flow path, and holding the battery cell group in the exterior body, wherein the battery cell group includes a convex part (for example, the convex part 617 described later), which protrudes toward the outer side wall provided with the temperature control medium flow path, on a lower portion; an inner surface (for example, the inner surface 33a described later) of the outer side wall provided with the temperature control medium flow path includes a concave part (for example, the concave part 37 described later), which is engageable with the convex part along a length direction of the exterior body, at a lower position than the temperature control medium flow path; and the battery cell group is held by the holding mechanism in a state of being positioned in the exterior body through engagement of the convex part and the concave part.

DESCRIPTION OF THE EMBODIMENTS

Figure 1:
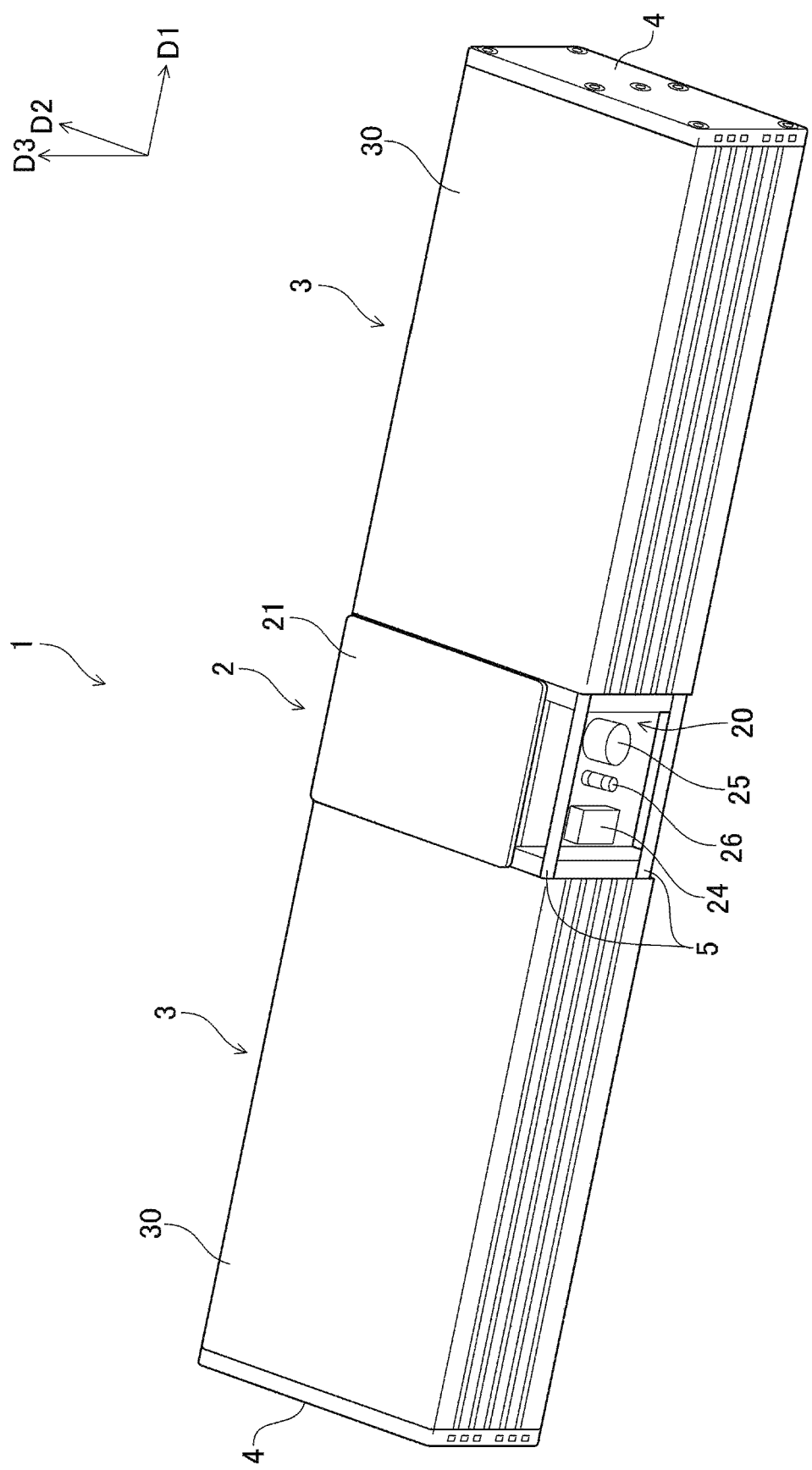
FIG. 1 is a perspective view showing an embodiment of the battery device according to the disclosure.

The disclosure provides a battery device that can achieve efficient heat exchange as well as easily position a plurality of stacked battery cells.

(1) A battery device according to the disclosure is a battery device (for example, the battery device 1 described later), including: an exterior body (for example, the exterior body 30 described later) including two outer side walls (for example, the outer side walls 33 described later); at least one battery cell group (for example, the battery cell group 6 described later) housed between the two outer side walls of the exterior body and configured by stacking a plurality of battery cells (for example, the battery cells 60 described later) each having an electrode terminal (for example, the electrode terminal 602 described later) on an upper portion; a temperature control medium flow path (for example, the temperature control medium flow path 36 described later) provided inside at least one of the two outer side walls (for example, the outer side walls 33 described later), wherein a temperature control medium for exchanging heat with the battery cells flows in the temperature control medium flow path; and a holding mechanism (for example, the holding mechanism 7 described later) applying a pressure on the battery cell group in a direction of pressing the battery cell group toward the outer side wall provided with the temperature control medium flow path, and holding the battery cell group in the exterior body, wherein the battery cell group includes a convex part (for example, the convex part 617 described later), which protrudes toward the outer side wall provided with the temperature control medium flow path, on a lower portion; an inner surface (for example, the inner surface 33a described later) of the outer side wall provided with the temperature control medium flow path includes a concave part (for example, the concave part 37 described later), which is engageable with the convex part along a length direction of the exterior body, at a lower position than the temperature control medium flow path; and the battery cell group is held by the holding mechanism in a state of being positioned in the exterior body through engagement of the convex part and the concave part.

According to the battery device described in the above (1), the positioning through engagement of the convex part and the concave part can be performed in the lower portion of the battery cell that has the electrode terminal on the upper portion. In addition, since the temperature control medium flow path is disposed at a higher position than the concave part, it can be arranged close to the electrode terminal on the upper portion of the battery cell to achieve efficient heat exchange between the battery cell and the temperature control medium. Therefore, it is possible to achieve efficient heat exchange as well as easily position a plurality of stacked battery cells.

(2) In the battery device according to (1), the temperature control medium flow path may be provided in each of the two outer side walls; a plurality of the battery cell groups may be housed in parallel between the two outer side walls of the exterior body; and the holding mechanism may be disposed between the battery cell groups, and apply a pressure on the battery cell groups in a direction of pulling the battery cell groups away from each other and pressing the battery cell groups toward the two opposite outer side walls, and hold the battery cell groups in the exterior body.

According to the battery device described in the above (2), since the battery cell groups can be housed in parallel in one exterior body, the battery cells can be arranged at a higher density, and each battery cell group can be easily brought into contact with and held to the outer side wall which is the heat exchange surface.

(3) In the battery device according to (1) or (2), preferably the exterior body is an extrusion-molded product with a direction along a lamination direction of the battery cells as an extrusion direction.

According to the battery device described in the above (3), the exterior body can be easily molded. Moreover, since the exterior body does not have a joint portion between plate members, there is no concern about assembly variation or thermal distortion, and there is no concern about distortion of the joint portion caused by the pressing pressure of the holding mechanism.

(4) In the battery device according to any one of (1) to (3), a crushable heat transfer sheet (for example, the heat transfer sheet 39 described later) may be disposed between the outer side wall, to which the battery cell group is pressed, and the battery cell group and at a higher position than the convex part; the battery cell group may include a stopper protrusion (for example, the stopper protrusion 616 described later), which is at a higher position than the heat transfer sheet and sets a gap (for example, the gap S described later) between the outer side wall, to which the battery cell group is pressed, and the battery cell group; and the heat transfer sheet may be crushed between the outer side wall, to which the battery cell group is pressed, and the battery cell group, and may be clamped in the gap set by the stopper protrusion.

According to the battery device described in the above (4), since the crushing amount of the heat transfer sheet can be easily limited by the stopper protrusion, it is possible to easily adjust the heat transfer amount to a desired amount.

(5) In the battery device according to (4), the battery cell group may include a separator (for example, the separator 61 described later) that insulates between the battery cells adjacent to each other in the lamination direction, and the convex part and the stopper protrusion may be provided on the separator.

According to the battery device described in the above (5), it is not required to form the convex part and the stopper protrusion on the cell case of the battery cell, and the battery cell with the insulating convex part and the stopper protrusion can be easily configured.

(6) In the battery device according to (5), the separator may include an upper side plate part (for example, the upper side plate part 613 described later) disposed on an upper portion of a side surface (for example, the side surface 60*d* described later) of the battery cell and a lower side plate part (for example, the lower side plate part 614 described later) disposed on a lower portion; the stopper protrusion may be provided on the upper side plate part of the separator, and the convex part may be provided on the lower side plate part of the separator.

According to the battery device described in the above (6), since the convex part and the stopper protrusion are disposed on the side surface of the battery cell, positioning of the battery cell and crushing of the heat transfer sheet can be performed stably.

(7) In the battery device according to any one of (1) to (6), the convex part may have a trapezoid shape that has two inclined outer surfaces (for example, the inclined outer surfaces 617*a* and 617*b* described later) arranged one above the other and one tip end surface (for example, the tip end surface 617*c* described later) between the two inclined outer surfaces, and the concave part may have two inclined inner surfaces (for example, the inclined inner surfaces 37*a* and 37*b* described later) to be respectively in contact with the two inclined outer surfaces of the convex part.

According to the battery device described in the above (7), by bringing the two inclined outer surfaces of the convex part and the two inclined inner surfaces of the concave part into contact, the battery cell can be positioned in the vertical direction. In the meantime, the amount of insertion of the convex part into the concave part can be adjusted by adjusting the width of the tip end surface of the convex part, so that it is possible to achieve positioning in the pressing direction with respect to the outer side wall.

According to the disclosure, it is possible to provide a battery device that can achieve efficient heat exchange as well as easily position a plurality of stacked battery cells.

Hereinafter, embodiments of a battery device according to the disclosure will be described in detail with reference to the drawings.

[Overall Configuration of the Battery Device]

Figure 2:
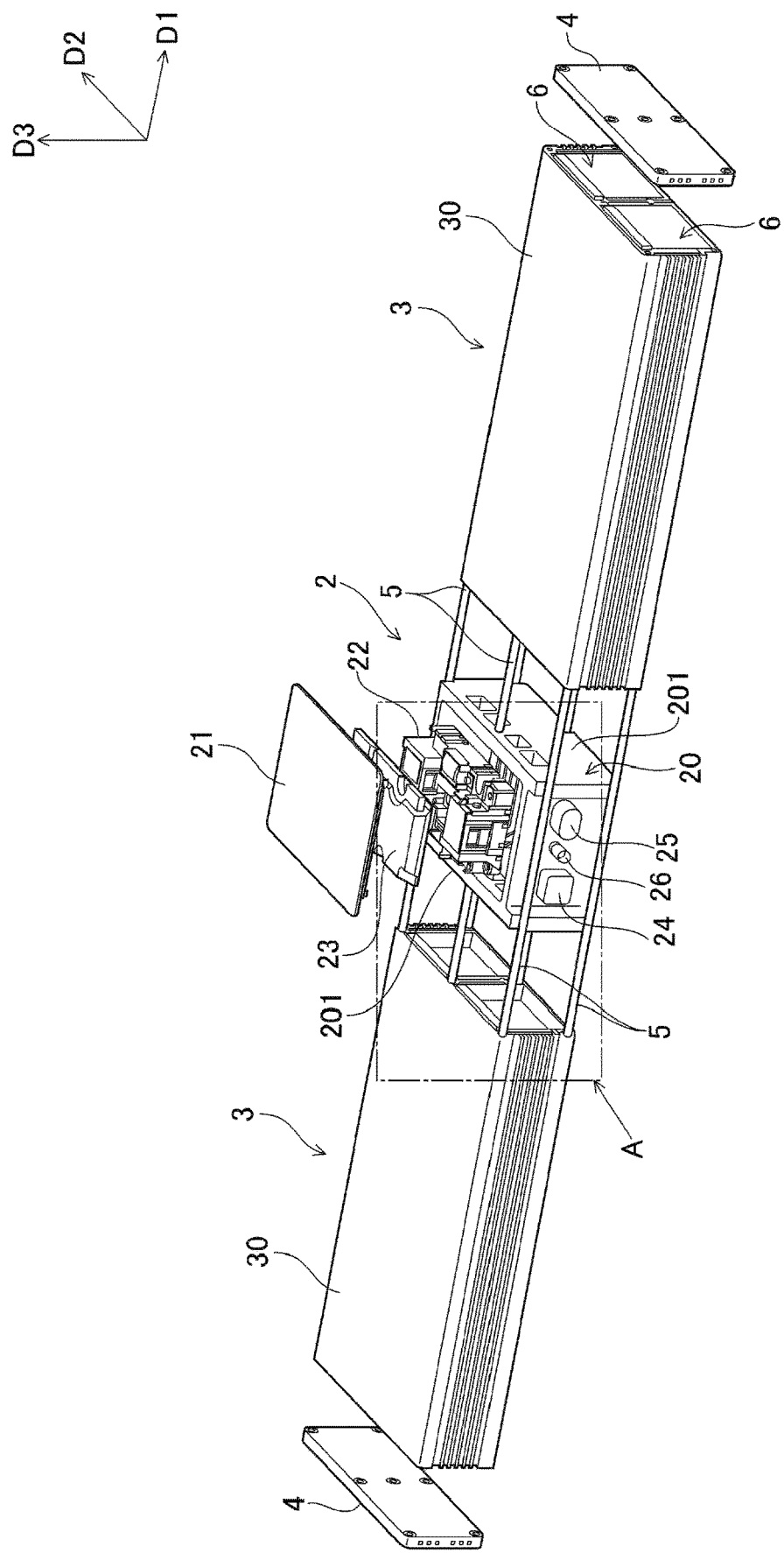
FIG. 2 is an exploded perspective view of the battery device shown in FIG. 1.

As shown in FIG. 1 and FIG. 2, the battery device 1 shown in the present embodiment includes one I/F (interface) box 2 and two battery cell mounting parts 3. Regarding the directions indicated by the arrows in each drawing of the specification, the direction along the direction D1 indicates the length direction of the battery device 1. The direction along the direction D2 indicates the width direction of the battery device 1. The direction along the direction D3 indicates the height direction of the battery device 1. The direction D3 indicates the "upper" side of the battery device 1, and the opposite direction indicates the "lower" side of the battery device 1.

The I/F box 2 is disposed in the central portion of the battery device 1, and the battery cell mounting parts 3 are respectively disposed at two ends of the I/F box 2 along the direction D1. The battery cell mounting parts 3 each have a battery cell group 6. The battery cell group 6 of the battery cell mounting part 3, which will be described in detail later, is positioned by a holding mechanism to be in contact with a heat exchange surface for heat exchange, and the contact state is maintained.

An end plate 4 is disposed on an end surface 3*a* of each battery cell mounting part 3, which is on the side far away from the I/F box 2. The two battery cell mounting parts 3 are connected by a plurality of long connection bolts 5 (six in the present embodiment) inserted between the battery cell mounting parts 3 through the I/F box 2. The end plates 4 shown in the present embodiment fasten the two battery cell mounting parts 3 in a direction to bring them close to each other with the fastening force of the connection bolts 5, and clamp the I/F box 2 from two sides. Nevertheless, the battery cell mounting parts 3 and the I/F box 2 are not necessarily connected by using the connection bolts 5, and may be connected by welding or other appropriate known bonding methods.

[I/F Box]

Figure 3:
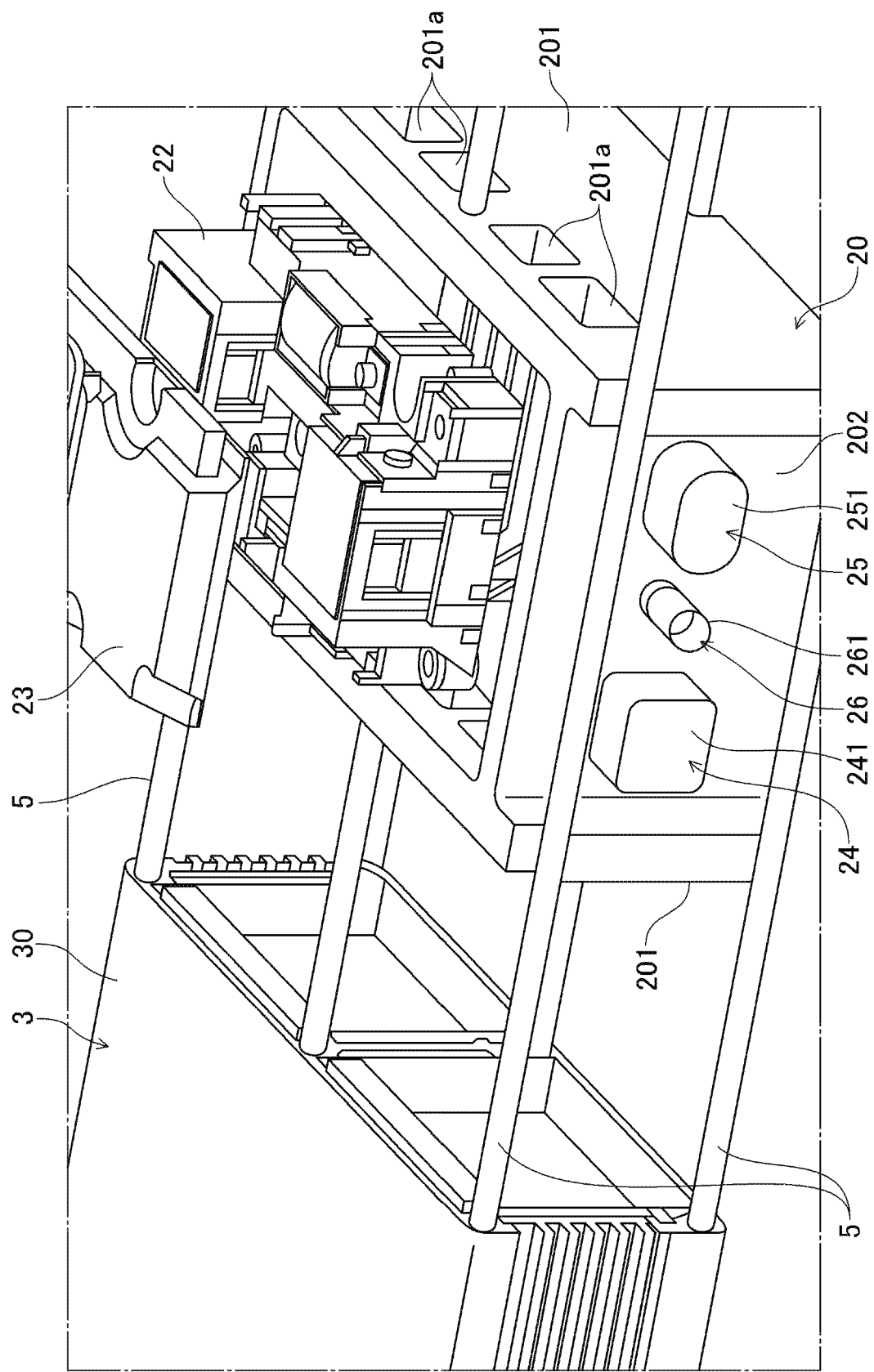
FIG. 3 is an enlarged view of the region A indicated by a rectangular frame in FIG. 2.

The I/F box 2 houses components 22 such as flow path parts for supplying a temperature control medium to the battery cell mounting parts 3, power distribution parts, and ECU (engine control unit). Specifically, as shown in FIG. 2 and FIG. 3, the I/F box 2 has a box body 20 and a lid 21 covering the upper surface of the box body 20, and houses the components 22 inside the box body 20. The components 22 are protected by a cover 23 in the box body 20.

The box body 20 is a container made of a rigid body of aluminum, an aluminum alloy or the like, and is formed in a rectangular shape in the plan view. Two parallel side wall parts 201 of the box body 20, which face in the direction D1, are respectively disposed on the sides connected to the battery cell mounting parts 3. In the battery device 1 shown in the present embodiment, the side wall parts 201 also function as the other end plates for clamping and fastening the battery cell groups 6 (will be described later) housed in the battery cell mounting parts 3 together with the end plates 4 from two sides. Therefore, the side wall part 201 has a sufficient thickness to withstand the large fastening load. The side wall parts 201 are respectively provided with a plurality of wiring insertion holes 201*a* for inserting the wires (not shown) that extend from the battery cell groups 6 in the battery cell mounting parts 3 so as to electrically connect them to the power distribution part of the components 22.

Figure 4:
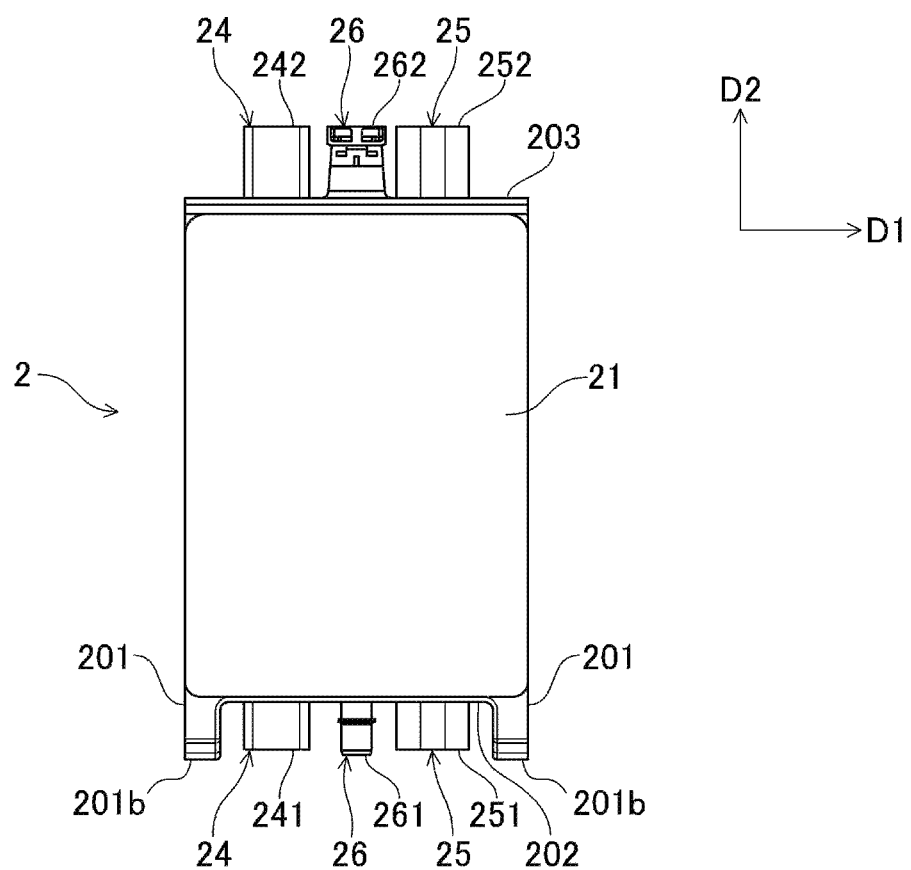
FIG. 4 is a plan view showing only the I/F box in the battery device.

As shown in FIG. 4, low voltage connectors 24, high voltage connectors 25, and temperature control medium supply connectors 26 are respectively arranged in a straight line along the direction D1 and protrude on two side wall parts 202 and 203 of the box body 20, which face in the direction D2. The low voltage connectors 24 and the high voltage connectors 25 are electrically connected to the power distribution part of the components 22 respectively. Further, the temperature control medium supply connectors 26 are in communication with the temperature control medium flow paths 36 (will be described later) of the battery cell mounting parts 3. The temperature control medium supply connector 26 is disposed between the low voltage connector 24 and the high voltage connector 25.

The low voltage connector 24 disposed on one side wall part 202 of the two side wall parts 202 and 203 is a male connector 241, and the low voltage connector 24 disposed on the other side wall part 203 is a female connector 242. Similarly, the high voltage connector 25 disposed on one side wall part 202 is a male connector 251, and the high voltage connector 25 disposed on the other side wall part 203 is a female connector 252. Similarly, the temperature control medium supply connector 26 disposed on one side wall part 202 is a male connector 261, and the temperature control medium supply connector 26 disposed on the other side wall part 203 is a female connector 262.

Figure 5:
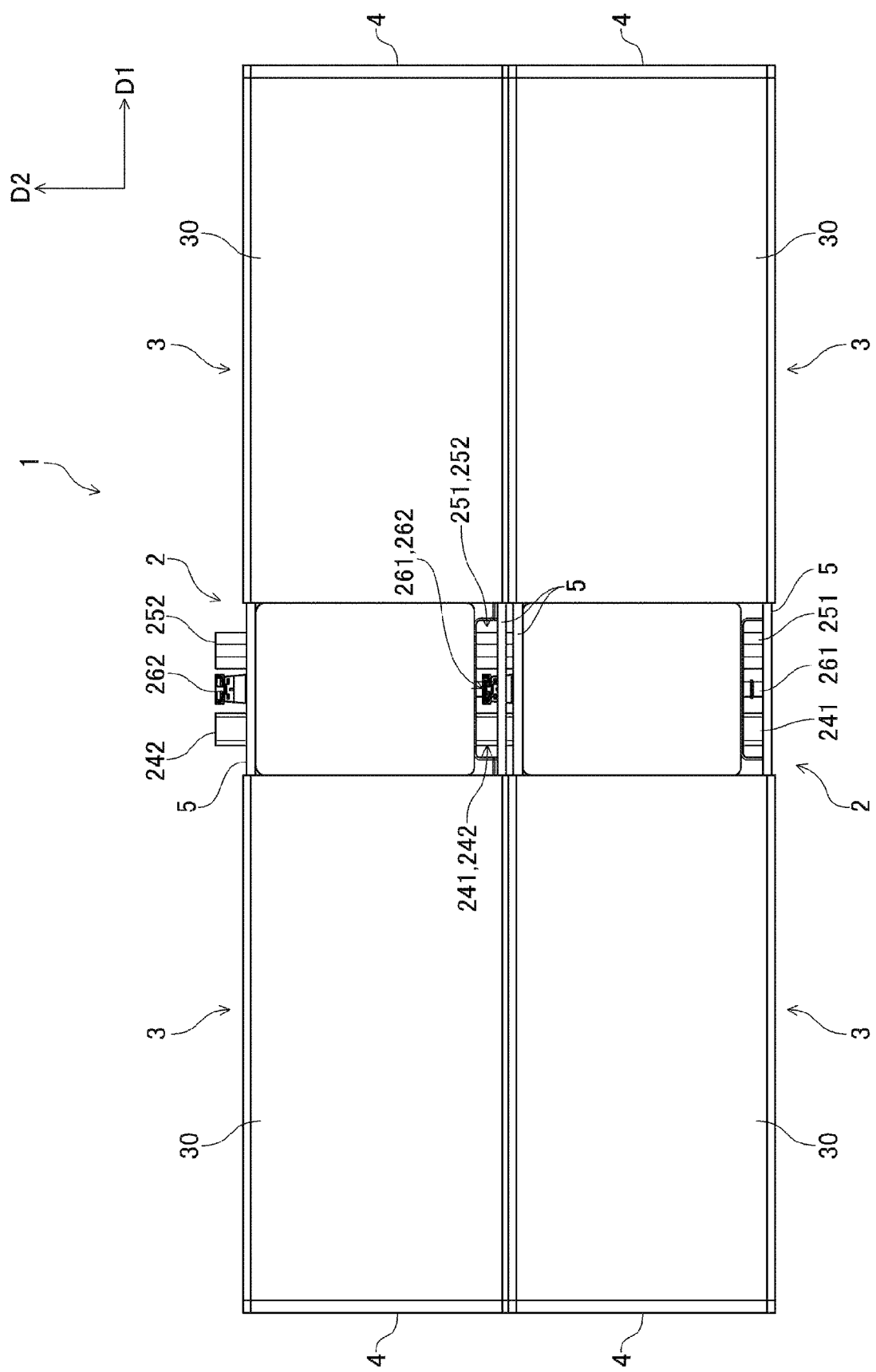
FIG. 5 is a plan view showing a state where the I/F boxes of battery device are connected.

The male connectors 241, 251, and 261 and the female connectors 242, 252, and 262 have structures that are complementarily connectable. In addition, the low voltage connectors 24, the high voltage connectors 25, and the temperature control medium supply connectors 26 on the two side wall parts 202 and 203 are respectively disposed in the same straight line along the direction D2. Therefore, as shown in FIG. 5, the battery device 1 and another battery device 1 having the same structure can be connected along the direction D2 by respectively connecting the low voltage connectors 24 with each other, the high voltage connectors 25 with each other, and the temperature control medium supply connectors 26 with each other. By connecting the connectors 24, 25, and 26, the battery devices 1 are electrically connected to each other, and the temperature control medium can circulate to each other via the temperature control medium supply connectors 26. Thus, a plurality of battery devices 1 can be functionally integrated, and a large capacity battery device can be easily configured by increasing the number of connected battery devices 1.

In the box body 20, one side wall part 202 of the side wall parts 202 and 203 is disposed at a recessed position slightly on the inner side (the side of the side wall part 203) with respect to the ends (the ends on the lower side in FIG. 4) 201b of the two side wall parts 201 connected to the battery cell mounting parts 3. Therefore, when a plurality of battery devices 1 are connected to each other, the connection portions of the connectors 24, 25, and 26 are housed between the ends 201b of the two side wall parts 201 and between the side wall parts 202 and 203 of the adjacent I/F boxes 2. Thus, the battery cell mounting parts 3 adjacent to each other in the connecting direction can be brought close to or into contact with each other as much as possible, and the load applied on the connection portion can be reduced.

[Battery Cell Mounting Part]

Figure 7:
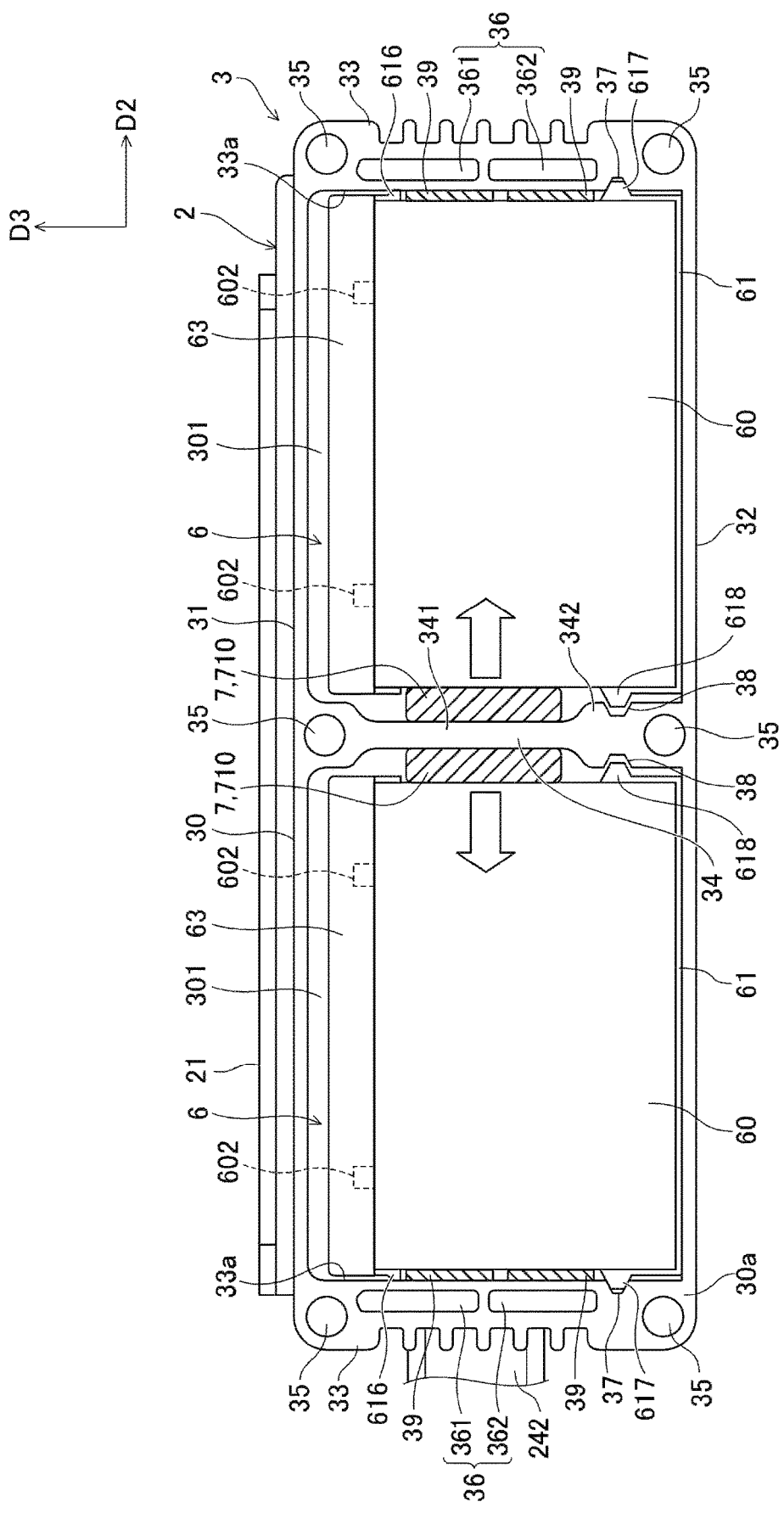
FIG. 7 is a view showing the inside of the exterior body of the battery device, showing an embodiment of the holding mechanism.

Two battery cell mounting parts 3 are disposed on two sides of the I/F box 2 to clamp the I/F box 2. Since the two battery cell mounting parts 3 have the same structure, an outline of one battery cell mounting part 3 will be described here. As shown in FIG. 7, the battery cell mounting part 3 has an exterior body 30, a battery cell group 6 housed in the exterior body 30, and a holding mechanism 7 holding the battery cell group 6 in the exterior body 30. The battery cell mounting part 3 shown in the present embodiment has two battery cell groups 6 arranged in parallel in the exterior body 30. Thus, the battery device 1 can arrange the battery cells 60 (will be described later) in a high density. Nevertheless, it is also possible to dispose only one battery cell group 6 in one exterior body 30.

(Exterior Body)

The exterior body 30 shown in the present embodiment is made of a rigid body such as aluminum, an aluminum alloy or the like, and is formed in a rectangular cylindrical shape. Two ends of the exterior body 30 in the length direction (the direction along the direction D1) are respectively opened in a horizontally long rectangular shape. As shown in FIG. 7, the exterior body 30 has an upper side wall 31, a lower side wall 32, two outer side walls 33 facing each other on the left and right, and a middle wall 34 disposed between the two outer side walls 33. As shown in FIG. 7, the exterior body 30 has an appropriate number of bolt insertion holes 35 for inserting the connection bolts 5 (not shown in FIG. 7). The bolt insertion holes 35 extend in the length direction of the exterior body 30 and penetrate the exterior body 30.

The temperature control medium flow paths (first temperature control medium flow path) 36 for circulating a temperature control medium are respectively provided inside the two outer side walls 33. The temperature control medium flow path 36 is disposed as close as possible to the inner surface 33a of the outer side wall 33. Thus, the inner surface 33a of the outer side wall 33 constitutes a heat exchange surface for heat exchange with the temperature control medium in the temperature control medium flow path 36 and realizes more efficient heat exchange with the temperature control medium. The temperature control medium flow path 36 in each outer side wall 33 is divided into two flow paths, which are an upper side flow path 361 disposed at the upper position and a lower side flow path 362 disposed at the lower position. The upper side flow path 361 and the lower side flow path 362 extend over the entire length of the exterior body 30 in the length direction (the direction D1) and are respectively opened on two end surfaces 30a of the exterior body 30. Although not shown, the end of the temperature control medium flow path 36 on the side of the I/F box 2 communicates with the temperature control medium supply connector 26 via the side wall part 201 of the I/F box 2 and the inside of the I/F box 2.

Regarding the temperature control medium, generally cooling air or cooling liquid can be used for cooling the battery cells 60 (will be described later) that constitute the battery cell group 6, but it is also possible to use air or liquid heated to a predetermined temperature for heating the battery cells 60 if required. In addition, although the temperature control medium flow path 36 shown in the present embodiment is completely embedded inside the outer side wall 33, the temperature control medium flow path 36 may be configured by a groove that is recessed from the outer side of the outer side wall 33, for example. In that case, the groove is covered by a plate or the like from the outer side of the outer side wall 33, so as to form a flow path for circulating the temperature control medium inside the outer side wall 33. In either case, the temperature control medium flow path 36 is disposed as close as possible to the inner surface 33a of the outer side wall 33 within the range of thickness of the outer side wall 33.

The middle wall 34 bisects the inside of the exterior body 30 in the direction D2. The middle wall 34 has a thin wall part 341 formed to be thin from the central portion of the battery cell group 6 in the height direction to the portion connected with the upper side wall 31, and a thick wall part 342 formed to be thick from the lower end of the thin wall part 341 to the portion connected with the lower side wall 32. The two spaces in the exterior body 30, partitioned by the middle wall 34, constitute battery cell group housing parts 301. One battery cell group 6 is housed in each battery cell group housing part 301. Thus, two battery cell groups 6 are arranged in parallel in the exterior body 30. However, the middle wall 34 is not essential to the exterior body 30 and can be provided if required.

A concave part 37, which is engageable with a convex part 617 (will be described later) that protrudes from the battery cell group 6, is formed on the inner surface 33a of the outer side wall 33 of the exterior body 30. As shown in detail in FIG. 14A, the concave part 37 has two inclined inner surfaces 37a and 37b arranged one above the other, and one groove bottom surface 37c arranged between the inclined inner surfaces 37a and 37b, and is formed in a trapezoid shape having a width that decreases from the inner surface 33a of the outer side wall 33 toward the groove bottom surface 37c. The concave part 37 shown in the present embodiment extends over the entire length of the exterior body 30 in the length direction. The concave part 37 is disposed at a lower position than the temperature control medium flow path 36 on the inner surface 33a of the outer side wall 33, as shown in FIG. 7. Therefore, the temperature control medium flow path 36 can be disposed close to the electrode terminals 62a and 62b on the upper portions of the battery cells 60.

Furthermore, concave parts 38, which are engageable with convex parts 618 (will be described later) that protrude from the battery cell groups 6 are formed on two surfaces of the thick wall part 342 of the middle wall 34. The specific configuration of the concave part 38 shown in the present embodiment is the same as that of the concave part 37, and the concave part 38 extends over the entire length of the exterior body 30 in the length direction. However, the specific configuration of the concave part 38 is not particularly limited as long as it can be engaged with the convex part 618 described later. The concave part 38 is disposed at the same height as the concave part 37 on the outer side wall 33 in the height direction of the exterior body 30.

The exterior body 30 of the present embodiment can be configured by an extrusion-molded product that is extruded along the direction D1 by forming the bolt insertion holes 35, the temperature control medium flow paths 36, the concave parts 37 and 38, and the battery cell group housing parts 301 in the same shape along the direction D1. Thereby, the exterior body 30 can be easily formed. Further, since the exterior body 30 made of an extrusion-molded product does not have a joint portion formed by joining plate members, there is no concern about assembly variation or thermal distortion resulting from the joint portion. In addition, the stress generated when the battery cell group 6 is pressed toward the outer side wall 33 by the holding mechanism 7 described later does not concentrate on the joint portion and cause distortion. Therefore, it is possible to configure the battery device 1 having the exterior body 30 that has a stable shape.

(Battery Cell Group)

Figure 8:
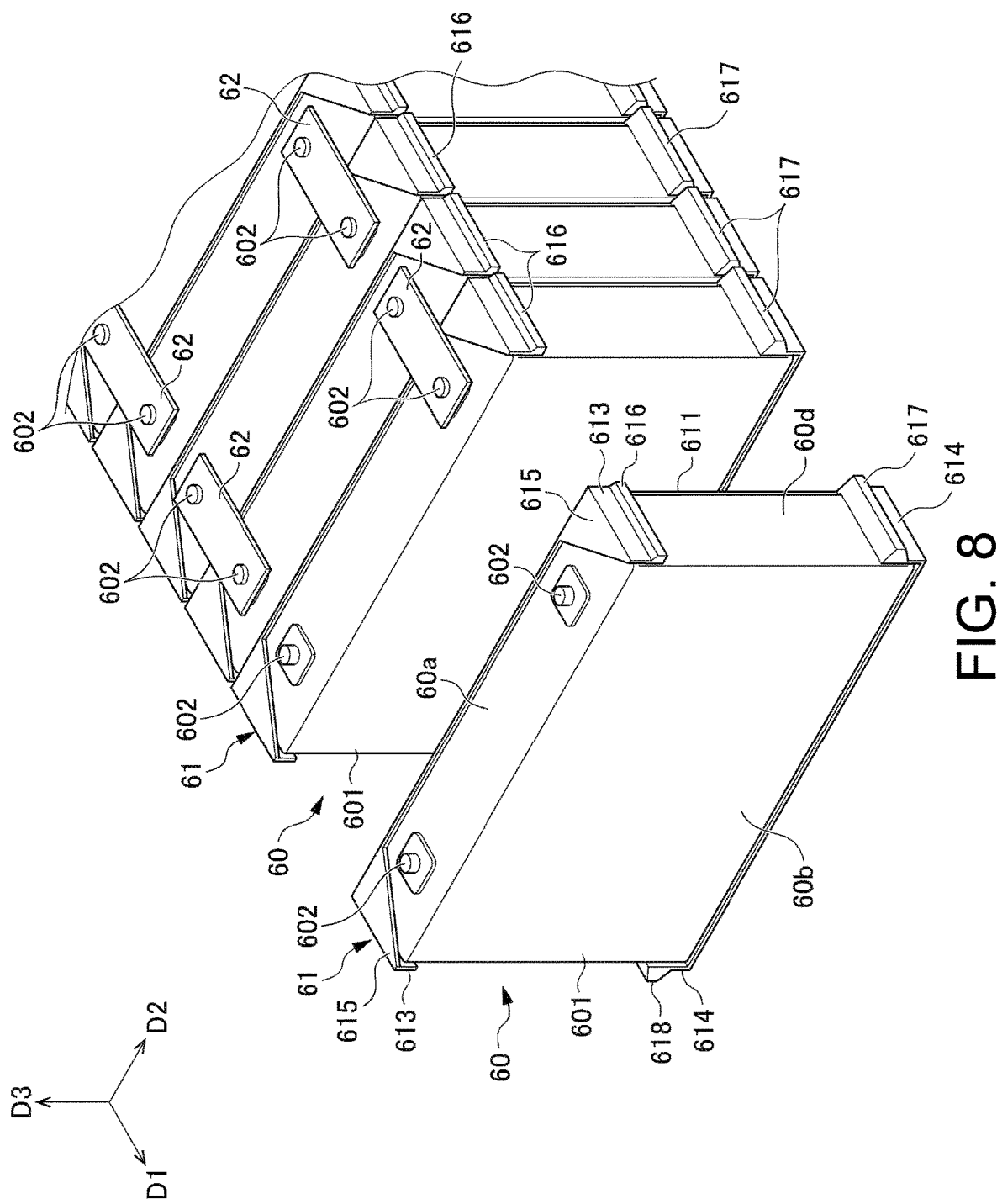
FIG. 8 is an enlarged perspective view of main parts, illustrating an outline of the battery cell group.

As shown in FIG. 8, the battery cell group 6 is configured by stacking a plurality of battery cells 60 composed of lithium ion secondary batteries, for example, along the direction D1 with separators 61 formed of an insulating resin material interposed therebetween. The battery cell 60 is configured by housing an electrode body (not shown) in a rectangular parallelepiped cell case 601 made of aluminum, an aluminum alloy or the like, and covering the upper surface of the cell case 601. A pair of positive and negative electrode terminals 602 are disposed to protrude on the upper surface 60a of the battery cell 60.

The electrode terminals 602 of the battery cells 60 adjacent to each other in the lamination direction are electrically connected by a bus bar 62 made of a metal plate. The battery cells 60 may be connected in series by electrically connecting the positive electrode terminal 602 and the negative electrode terminal 602 adjacent to each other in the lamination direction with the bus bar 62, or may be connected in parallel by electrically connecting the positive electrode terminals 602 and the negative electrode terminals 602 adjacent to each other in the lamination direction with the bus bar.

Figure 6:
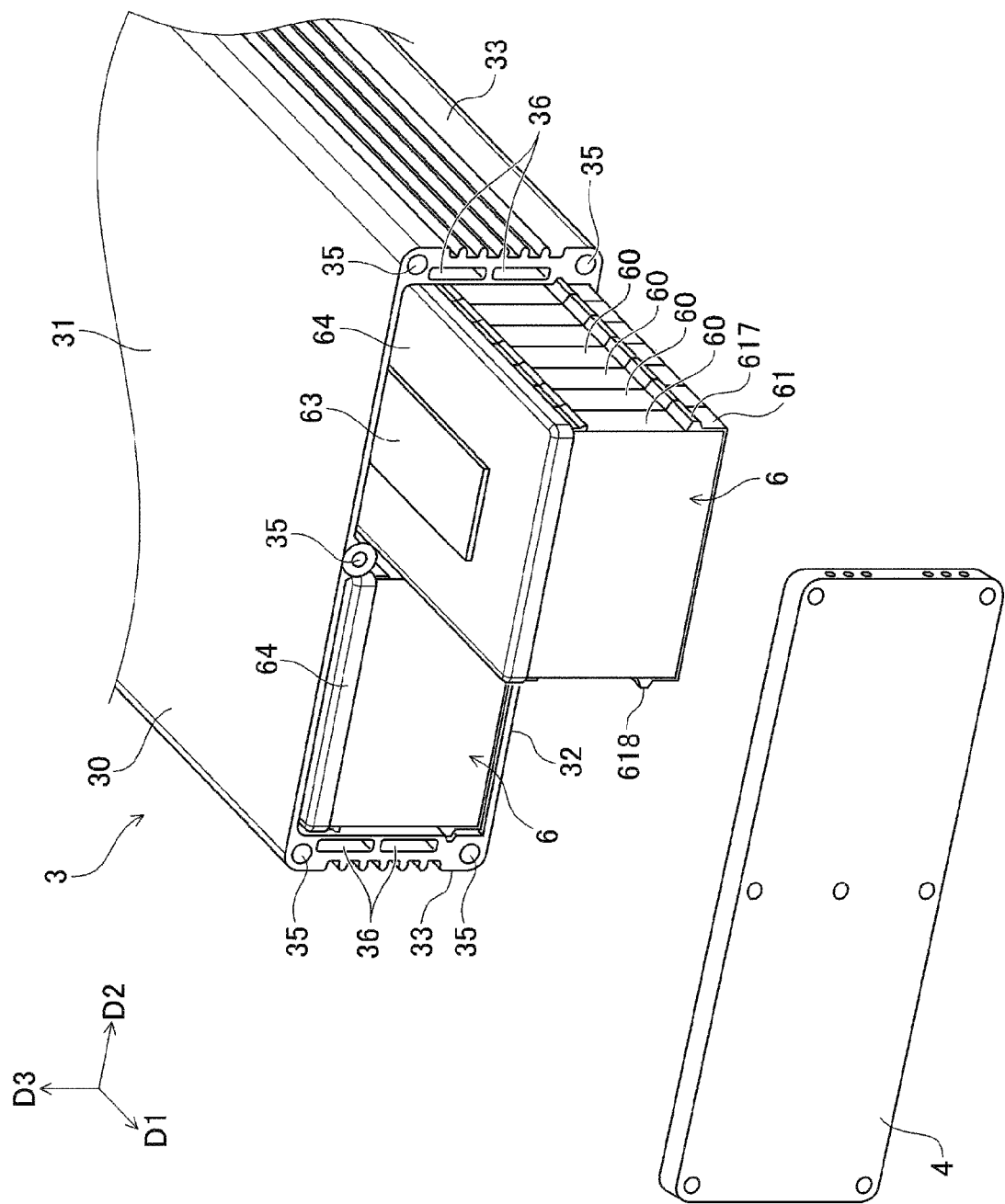
FIG. 6 is an enlarged perspective view of main parts, showing how the battery cell group is housed in the exterior body of the battery device.

As shown in FIG. 6, a state detection part 63 for detecting the battery state, such as a CVS (Cell Voltage Sensor) that detects the voltage of the battery cell 60, is disposed on the upper surface of the battery cell group 6. A cover 64 covering all the battery cells 60 of the battery cell group 6 is disposed around the state detection part 63 to protect the electrode terminals 602 and the like.

As shown in FIG. 7, the heat transfer sheets 39 are respectively interposed between the battery cell groups 6 in the exterior body 30 and the outer side walls 33 having the temperature control medium flow paths 36. The heat transfer sheet 39 is formed of a resin sheet having heat conductivity such as silicone. The heat transfer sheet 39 may be elongated along the lamination direction of the battery cells 60, or may be divided into pieces corresponding to the battery cells 60. Also, the heat transfer sheet 39 may be attached to the battery cell 60 in advance or may be attached to the inner surface 33a of the outer side wall 33 in advance before the battery cell group 6 is housed in the exterior body 30. When the battery cell group 6 is pressed toward the outer side wall 33 by the holding mechanism 7 described later, the heat transfer sheet 39 is crushed between the battery cell group 6 and the outer side wall 33 and is in close contact with them. Thus, each battery cell 60 of the battery cell group 6 is in contact with the inner surface 33a of the outer side wall 33 via the heat transfer sheet 39 for heat exchange, and the heat exchange with the temperature control medium in the temperature control medium flow path 36 is performed properly.

Figure 9:
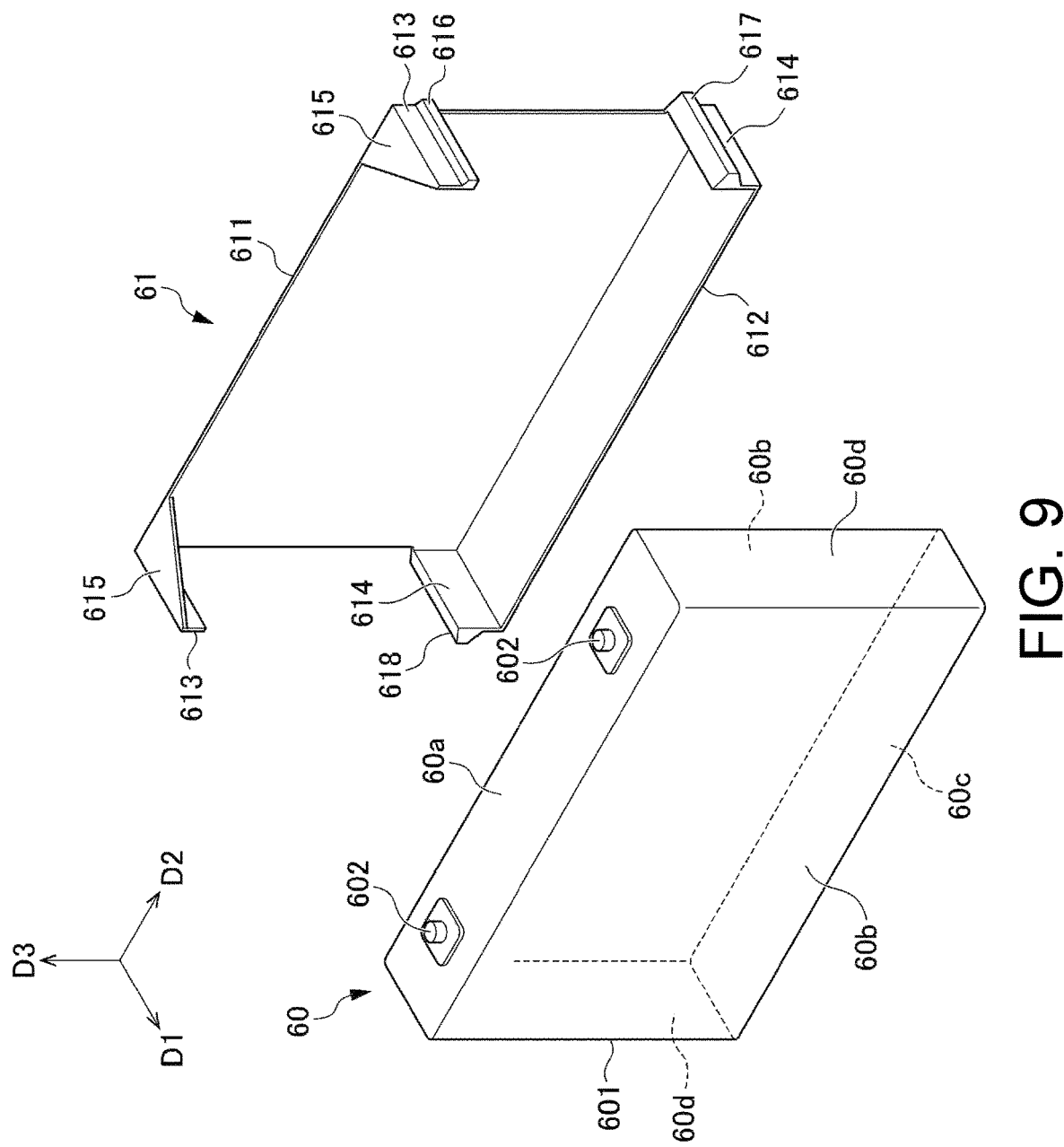
FIG. 9 is an exploded perspective view illustrating the battery cell and the separator.

The separator 61 is disposed between the battery cells 60 adjacent to each other in the lamination direction. As shown in FIG. 9, the separator 61 has a separator body 611, a bottom plate part 612, a pair of upper side plate parts 613, and a pair of lower side plate parts 614.

The separator body 611 is formed of a rectangular flat plate having substantially the same area as an outer surface 60b of the battery cell 60, which faces the lamination direction. The bottom plate part 612 is integrally provided at the lower end of the separator body 611. The bottom plate part 612 is formed of a rectangular flat plate having substantially the same area as a bottom surface 60c of the battery cell 60, and is orthogonal to the separator body 611 along the lamination direction of the battery cell 60.

The upper side plate parts 613 are integrally provided at the upper left and right ends of the separator body 611. The upper side plate parts 613 extend from the separator body 611 in the same direction as the bottom plate part 612. The dimension of the upper side plate part 613 in the height direction (the direction D3) is sufficiently short compared with the height of the battery cell 60. The dimension of the upper side plate part 613 in the length direction (the direction D1) is substantially the same as the dimension of the battery cell 60 in the thickness direction (the direction D1). Triangular corner plate parts 615 connecting the upper edges are respectively provided between the upper side plate parts 613 and the separator body 611. The corner plate parts 615 are disposed in parallel to the bottom plate part 612.

The lower side plate parts 614 are integrally provided at the lower left and right ends of the separator body 611. Similar to the upper side plate parts 613, the lower side plate parts 614 extend from the separator body 611 in the same direction as the bottom plate part 612. The lower side plate part 614 is provided over the lower side edge of the separator body 611 and the side edge of the bottom plate part 612. Therefore, the lower side plate part 614 has a shape that rises upward from two ends of the bottom plate part 612. The dimension of the lower side plate part 614 in the height direction (the direction D3) is sufficiently short compared with the height of the battery cell 60. The dimension of the lower side plate part 614 in the length direction (the direction D1) is substantially the same as the dimension of the battery cell 60 in the thickness direction (the direction DD).

The separator 61 houses the battery cell 60 in a space surrounded by the separator body 611, the bottom plate part 612, the pair of upper side plate parts 613, the pair of lower side plate parts 614, and two corner plate parts 615. The bottom surface 60c of the battery cell 60 is placed on the bottom plate part 612 of the separator 61. The upper side plate parts 613 and the lower side plate parts 614 are separately disposed at the upper ends and the lower ends of the two side surfaces 60d of the battery cell 60 and clamp the battery cell 60 from two sides in the width direction. The corner plate parts 615 are disposed to cover the corners of the upper surface 60a of the battery cell 60. Furthermore, the separator body 611 is disposed to cover one entire outer surface 60b of the battery cell 60. Thus, the separator 61 is mounted on the battery cell 60 without misalignment, and insulates between the adjacent battery cells 60 in the battery cell group 6 and between the battery cell 60 and the lower side wall 32 of the exterior body 30.

Since the separator body 611 of the separator 61 is a flat plate, when a plurality of battery cells 60 are stacked with the separator 61 interposed therebetween, it is possible to narrow the interval between the adjacent battery cells 60 as much as possible. Therefore, enlargement of the battery cell group 6 in the direction D1 is suppressed, and the size of the battery device 1 is reduced. Further, as shown in FIG. 8, the side surface 60d of the battery cell 60 is largely opened between the upper side plate part 613 and the lower side plate part 614 when the separator 61 is mounted. Therefore, heat exchange with the temperature control medium that circulates in the temperature control medium flow path 36 in the outer side wall 33 can be performed by using the side surface 60d of the battery cell 60.

As shown in FIG. 8 to FIG. 11, a stopper protrusion 616 is provided on the upper side plate part 613 of the separator 61. The stopper protrusion 616 shown in the present embodiment is disposed along the lower end of the upper side plate part 613 and extends in the lamination direction of the battery cell 60. The stopper protrusion 616 protrudes from the battery cell group 6 (the side surface 60d of the battery cell 60) toward the outer side wall 33 with a predetermined protrusion height H1, so that when the battery cell group 6 is pressed toward the outer side wall 33 by the holding mechanism 7 described later, the stopper protrusion 616 comes into direct contact with the inner surface 33a of the outer side wall 33 prior to the side surface 60d of the battery cell 60. The heat transfer sheet 39 is disposed at a lower position than the stopper protrusion 616 and does not interfere with the stopper protrusion 616.

Figure 13A:
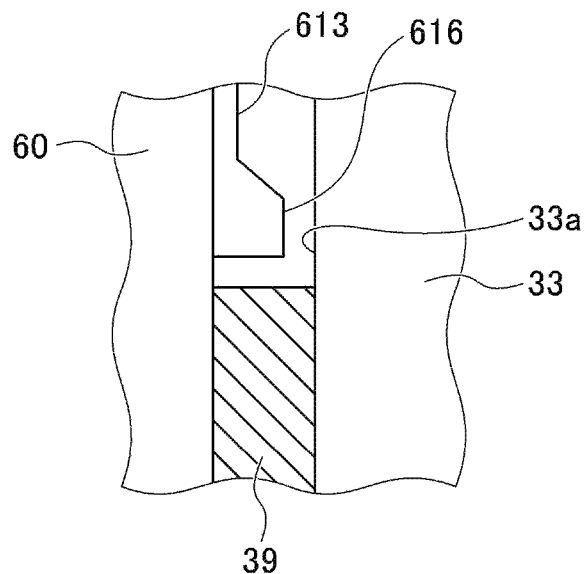
FIG. 13A is an enlarged view of main parts, showing the relationship between the stopper protrusion and the outer side wall of the battery cell group before the pressure in the pressing direction is applied.
Figure 13B:
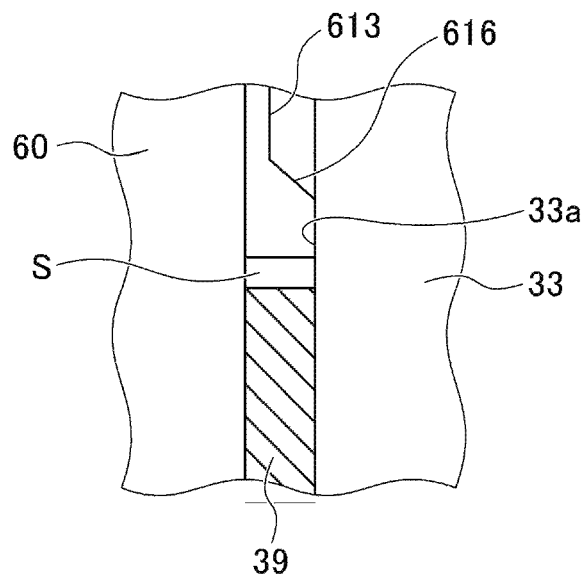
FIG. 13B is an enlarged view of main parts, showing the relationship between the stopper protrusion and the outer side wall of the battery cell group after the pressure in the pressing direction is applied.

As shown in FIG. 13B, a gap S corresponding to the protrusion height H1 is formed between the upper portion of the battery cell group 6 and the inner surface 33a of the outer side wall 33 of the exterior body 30 by the stopper protrusion 616. The thickness of the heat transfer sheet 39 before being crushed is larger than the protrusion height H1 of the stopper protrusion 616. Therefore, due to the contact between the stopper protrusion 616 and the outer side wall 33, the thickness of the heat transfer sheet 39 after being crushed between the battery cell group 6 and the outer side wall 33 is limited to the width of the gap S defined by the protrusion height H1.

As shown in FIG. 8 to FIG. 10 and FIG. 12, the convex part 617 is provided on the lower side plate part 614, disposed on the side of the outer side wall 33, of the pair of lower side plate parts 614 of the separator 61. The convex part 617 is provided on the upper end of the lower side plate part 614 to protrude in the same direction as the protrusion direction of the stopper protrusion 616. The convex part 617 extends along the lamination direction of the battery cell 60. The protrusion height H2 of the convex part 617 from the side surface 60d of the battery cell 60 is larger than the protrusion height H1 of the stopper protrusion 616. The heat transfer sheet 39 is disposed at a higher position than the convex part 617 and does not interfere with the convex part 617.

Figure 12:
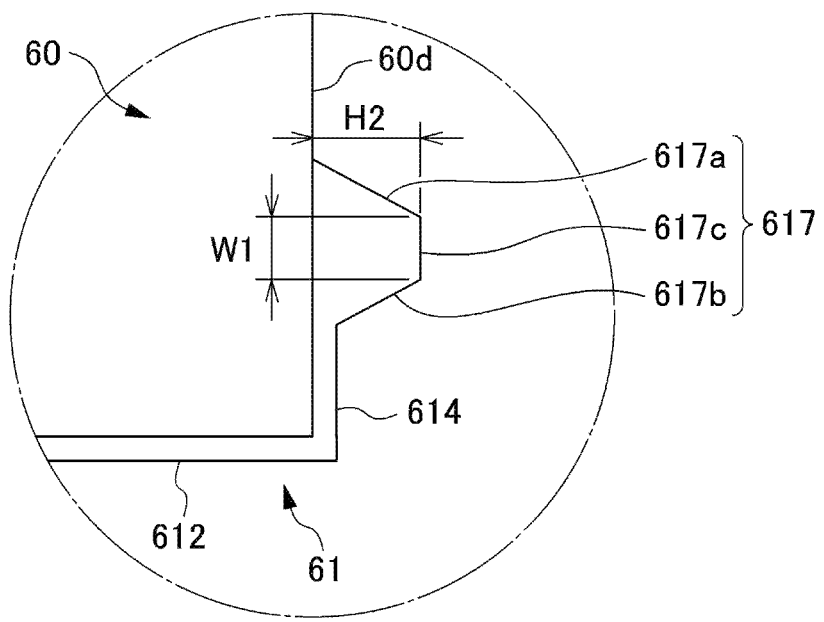
FIG. 12 is an enlarged view of the region C indicated by a circular frame in FIG. 10.
Figure 14A:
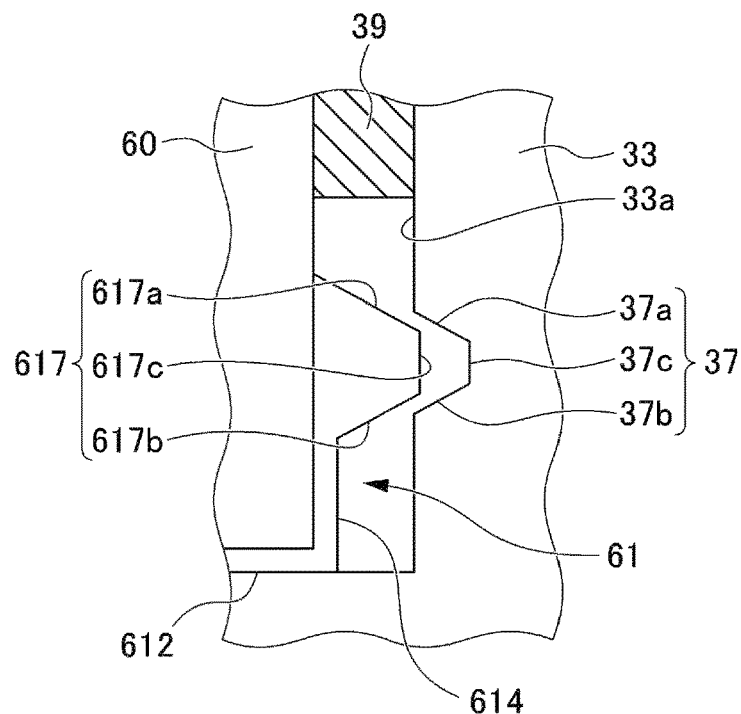
FIG. 14A is an enlarged view of main parts, showing the relationship between the convex part and the outer side wall of the battery cell group before the pressure in the pressing direction is applied.
Figure 14B:
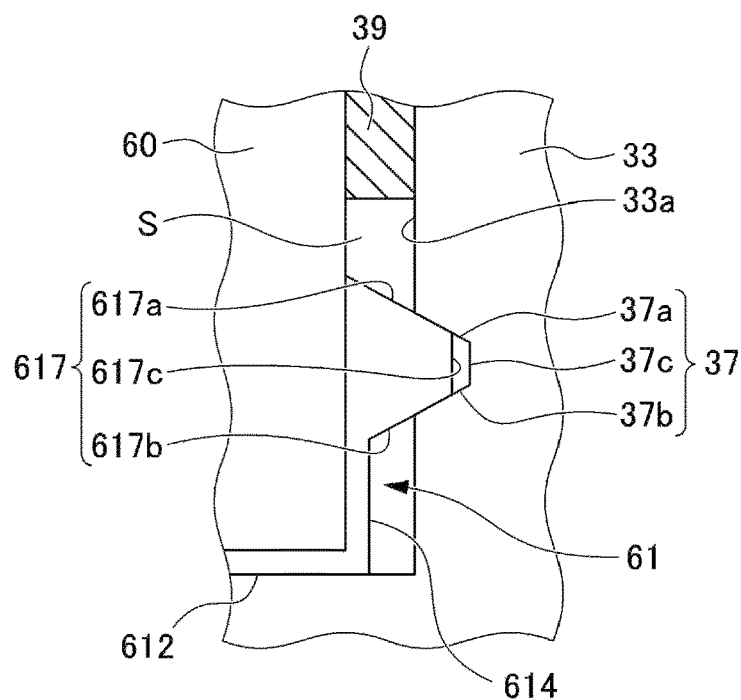
FIG. 14B is an enlarged view of main parts, showing the relationship between the convex part and the outer side wall of the battery cell group after the pressure in the pressing direction is applied.

The convex part 617 is disposed corresponding to the position of the concave part 37 of the outer side wall 33. As shown in FIG. 12, the convex part 617 has two inclined outer surfaces 617a and 617b arranged one above the other, and one tip end surface 617c arranged between the two inclined outer surfaces 617a and 617b, and is formed in a trapezoid shape having a width that decreases from the side surface 60d of the battery cell 60 toward the tip end surface 617c. The inclination angles of the two inclined outer surfaces 617a and 617b are substantially equal to the inclination angles of the two inclined inner surfaces 37a and 37b of the concave part 37. The width W1 of the tip end surface 617c of the convex part 617 along the vertical direction is smaller than the groove width of the concave part 37 (the width of the entrance of the concave part 37 along the vertical direction) and is larger than the width of the groove bottom surface 37c along the vertical direction. Thus, as shown in FIG. 7 and FIG. 14B, the convex part 617 enters and is engaged with the concave part 37 provided on the outer side wall 33 when the battery cell group 6 is housed in the exterior body 30 and pressed toward the outer side wall 33 by the holding mechanism 7 described later.

Figure 10:
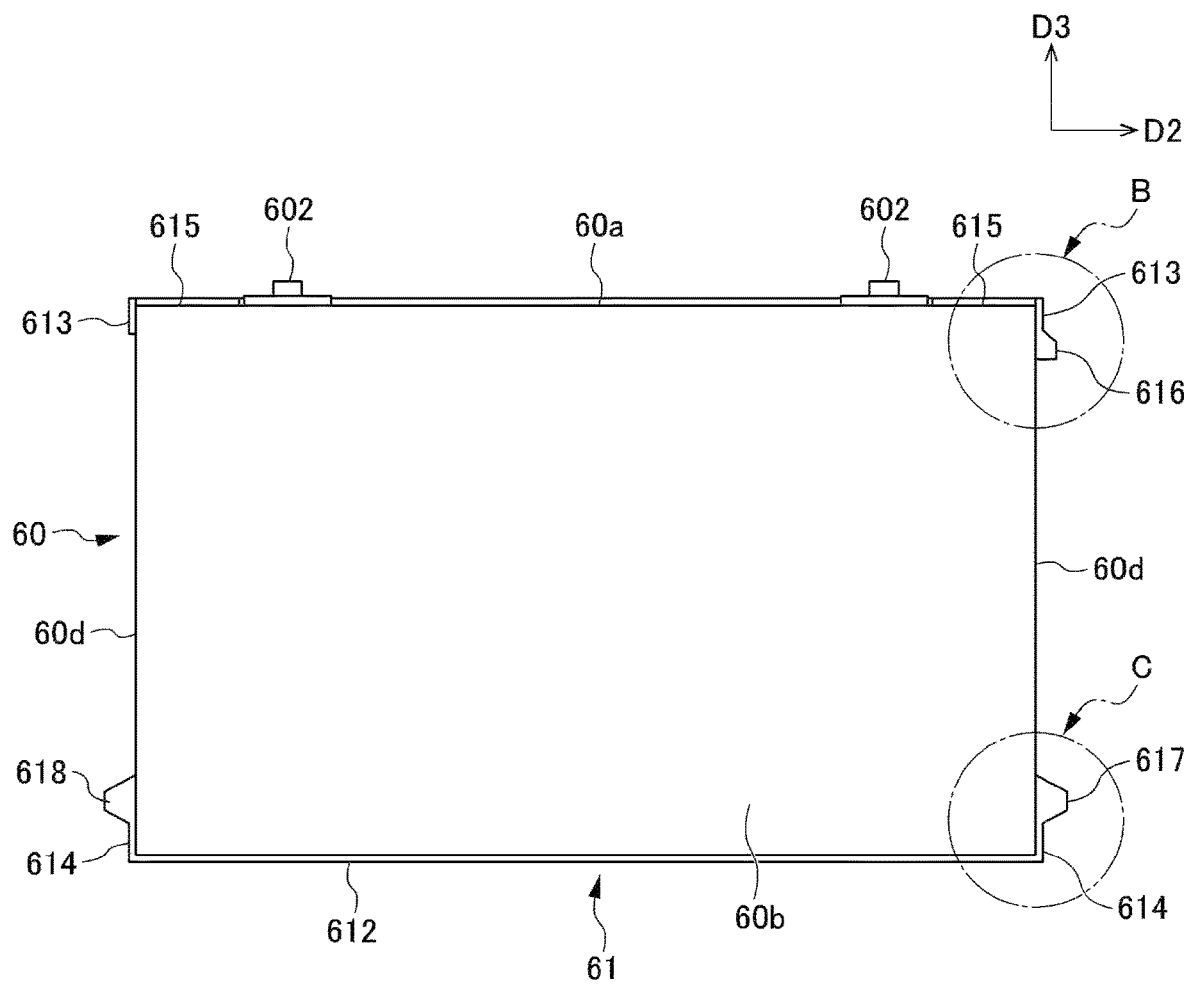
FIG. 10 is a front view of the battery cell with the separator installed.
Figure 11:
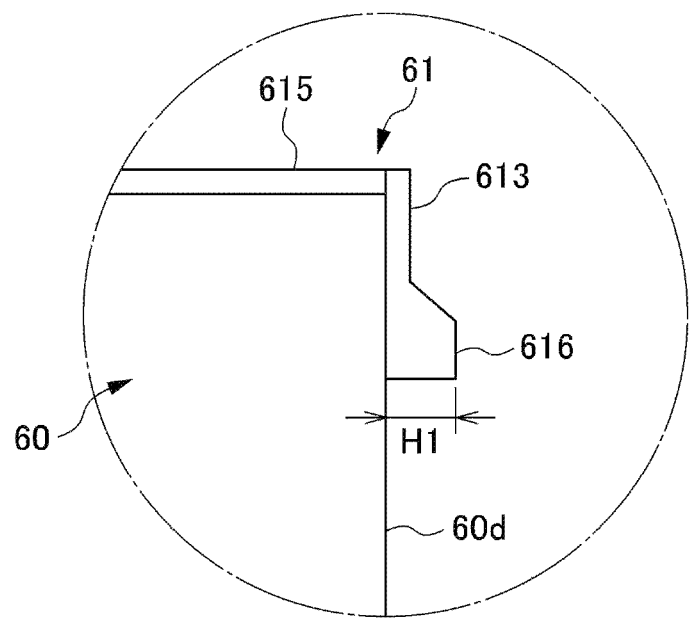
FIG. 11 is an enlarged view of the region B indicated by a circular frame in FIG. 10.

As shown in FIG. 7, FIG. 8, and FIG. 10, the convex part 618 is also provided on the lower side plate part 614, disposed on the side of the middle wall 34, of the pair of lower side plate parts 614 of the separator 61. The convex part 618 shown in the present embodiment has the same configuration as the convex part 617 except that the convex part 618 is arranged symmetrically to the convex part 617. The convex part 618 is disposed corresponding to the position of the concave part 38 of the middle wall 34. However, the specific configuration of the convex part 618 is not particularly limited as long as it can be engaged with the concave part 38 of the middle wall 34.

It suffices if the stopper protrusion 616 of the separator 61 is provided on the upper side plate part 613, which is on the side opposite to the outer side wall 33, of the pair of upper side plate parts 613. In addition, the stopper protrusion 616 and the convex parts 617 and 618 may not necessarily be provided on all the separators 61 of the battery cell group 6.

The battery cell group 6 is configured by stacking a plurality of sets of the battery cells 60 and the separators 61. The battery cell group 6 housed in the exterior body 30 is fastened by the connection bolts 5 between the end plate 4 and the side wall part 201 of the I/F box 2. Thus, expansion of the battery cell 60 is suppressed. In the present embodiment, as shown in FIG. 6, one end plate 4 is used for two battery cell groups 6 arranged in parallel in the exterior body 30, and the battery cells 60 of the two battery cell mounting parts 3 disposed to clamp the I/F box 2 are integrally fastened between the end plates 4 by the connection bolts 5.

The end plate 4 is made of a rigid body, e.g. a metal such as aluminum or an aluminum alloy, a resin such as an engineering plastic, or a composite of the metal and resin. The end plate 4 may have a communication flow path (not shown) inside, which communicates with the temperature control medium flow path 36. For example, the communication flow path is provided to communicate the temperature control medium flow paths 36 of the two outer side walls 33 with each other. Also, the communication flow path may be provided on the surface in contact with the end surface 30a of the exterior body 30 to communicate the upper side flow path 361 and the lower side flow path 362 of the temperature control medium flow path 36 of one outer side wall 33 with each other, for example. Thus, it is possible to efficiently circulate the temperature control medium in the exterior body 30 by using the end plate 4.

(Holding Mechanism)

The holding mechanism 7 applies a pressure on the battery cell group 6 in the exterior body 30 in a direction of pressing it toward the inner surface 33a of the outer side wall 33 having the temperature control medium flow path 36. Thus, the holding mechanism 7 brings the side surfaces 60d of all the battery cells 60 of the battery cell group 6 into contact with the inner surface 33a of the outer side wall 33 via the heat transfer sheet 39 for heat exchange, and holds the battery cells 60 in the exterior body 30 while maintaining the contact state. The battery cells 60 pressed against the inner surface 33a of the outer side wall 33 by the holding mechanism 7 exchange heat with the temperature control medium in the temperature control medium flow path 36 via the heat transfer sheet 39 and the inner surface 33a of the outer side wall 33. The holding mechanism 7 is not required to hold the battery cells 60 one by one on the heat exchange surface, and can hold the entire battery cell group 6 together. Therefore, the workability for bringing the battery cells 60 into contact with the heat exchange surface for heat exchange and holding them is improved, and the battery cells 60 can be easily held.

The holding mechanism 7 is not particularly limited as long as it can apply a pressure on the battery cell group 6 in the exterior body 30 in the direction of pressing it toward the inner surface 33a of the outer side wall 33. The holding mechanism 7 shown in FIG. 7 is made of a resin 710. A resin that expands due to a chemical reaction, for example, can be used as the resin 710. Urethane resin that expands due to the chemical reaction of two liquids is a specific example of the resin that expands due to a chemical reaction. The resin 710 is filled along the lamination direction of the battery cells 60 in the gaps between the two battery cell groups 6 arranged in parallel and two surfaces of the thin wall part 341 of the middle wall 34. When the resin 710 expands due to the chemical reaction after being filled, the resin 710 with the middle wall 34 interposed therebetween applies a pressure (expansion pressure) on the battery cell groups 6 in the direction of pulling the battery cell groups 6 away from each other and pressing them toward the opposite two outer side walls 33. Since the resin 710 maintains the expansion state after it expands due to the chemical reaction, the battery cells 60 of each battery cell group 6 are respectively brought into contact with the inner surface 33a of the outer side wall 33 via the heat transfer sheet 331, and the contact state is maintained. Therefore, the battery cells 60 can efficiently exchange heat with the temperature control medium in the temperature control medium flow path 36.

Also, the resin 710 may apply a pressure (filling pressure) on the battery cell group 6 in the direction of pressing it toward the outer side wall 33 with a high filling pressure at the time when the resin 710 is filled into the exterior body 30. After being filled into the exterior body 30 with a predetermined filling pressure, the resin 710 is cured in the exterior body 30 to maintain a predetermined hardness, and maintains the pressure pressing on the battery cell group 6. Thus, the battery cells 60 are respectively brought into contact with the inner surface 33a of the outer side wall 33 via the heat transfer sheet 331 for heat exchange, and the contact state is maintained. Therefore, the battery cells 60 can efficiently exchange heat with the temperature control medium in the temperature control medium flow path 36. The resin 710 used in this case is not particularly limited, and may be composed of a thermoplastic resin, a thermosetting resin, an elastomer, a rubber, or a combination of these, for example.

Through expansion or filling, the resin 710 can easily follow the concave and convex parts on the side surfaces of the battery cell groups 6. Therefore, even if the individual battery cells 60 of the battery cell group 6 have variations in width, the pressure can allow the variations and be applied uniformly to each battery cell 60. In addition, since a very narrow space is sufficient for filling the resin 710, the size of the exterior body 30 can be further reduced. Furthermore, the resin 710 can also insulate between the battery cell group 6 and the middle wall 34 or between the battery cell groups 6 arranged in parallel. In addition, in the case where the exterior body 30 is not provided with the middle wall 34, the resin 710 may be commonly provided between the two battery cell groups 6.

(Method of Housing the Battery Cell Group)

Next, an example of a specific method of housing the battery cell group 6 in the exterior body 30 will be described. First, the battery cell group 6 is configured by stacking a plurality of battery cells 60 with the separator 61 having the stopper protrusion 616 and the convex part 617 interposed therebetween. In this method, the heat transfer sheet 39 is attached to the battery cell 60 of the battery cell group 6 in advance.

Next, the battery cell group 6 is housed in the battery cell group housing part 301 of the exterior body 30. At this time, the battery cell group 6 is slid along the direction D1 and inserted into the battery cell group housing part 301 from the side of one end surface 3a (the end surface 3a on the side far away from the I/F box 2) of the exterior body 30. At this time, the battery cell group 6 is close to the side of the middle wall 34 and inserted. It is to prevent the heat transfer sheet 39 from interfering with the inner surface 33a of the outer side wall 33 when the battery cell group 6 is inserted. Therefore, as shown in FIG. 13A, the stopper protrusion 616 protruding toward the outer side wall 33 is not yet in contact with the outer side wall 33, and as shown in FIG. 14A, the convex part 617 protruding toward the outer side wall 33 is not completely inserted into the concave part 37. On the other hand, the convex part 618 disposed on the side of the middle wall 34 is inserted into and engaged with the concave part 38 of the middle wall 34. Therefore, the battery cell group 6 slid into the exterior body 30 is smoothly inserted while being guided by the concave part 38. Moreover, in order to maintain the stack state of the battery cells 60 during the insertion to facilitate the insertion process, although not shown, the battery cell group 6 may be simply tied and integrated by a tying band or the like.

After two battery cell groups 6 are inserted into the battery cell group housing parts 301, the holding mechanisms 7 are arranged between the middle wall 34 and the battery cell groups 6. The holding mechanism 7 applies a pressure on the battery cell group 6 in the direction of pressing it toward the outer side wall 33. Thus, the battery cell group 6 is pressed toward the outer side wall 33 and clamps the heat transfer sheet 39 with the outer side wall 33, as shown in FIG. 13A and FIG. 14A. The battery cell group 6 gradually crushes the heat transfer sheet 39 as it moves further in the pressing direction.

Then, in the upper portion of the battery cell group 6, as shown in FIG. 13B, when the stopper protrusion 616 comes into contact with the inner surface 33a of the outer side wall 33, the movement of the battery cell group 6 toward the outer side wall 33 ends. Thus, the gap S having a width corresponding to the protrusion height H1 of the stopper protrusion 616 is formed between the battery cell group 6 and the outer side wall 33. The heat transfer sheet 39 is crushed to a thickness equal to the width of the gap S, and is in close contact with the battery cell group 6 and the outer side wall 33 respectively.

On the other hand, in the lower portion of the battery cell group 6, the convex part 617 is inserted into the concave part 37 of the outer side wall 33 as the battery cell group 6 moves to the outer side wall 33. Then, as shown in FIG. 14B, when the inclined outer surfaces 617a and 617b of the convex part 617 come into contact with the inclined inner surfaces 37a and 37b of the concave part 37, the movement of the battery cell group 6 toward the outer side wall 33 ends. At this time, the contact between the inclined surfaces of the convex part 617 and the concave part 37 prevents the battery cell group 6 from moving in the vertical direction in the exterior body 30 and positions it. At the same time, the battery cell group 6 is also prevented from moving toward the outer side wall 33 and positioned. Furthermore, the battery cell group 6 is held in the exterior body 30 in the state of being pressed toward the outer side wall 33 and positioned by the continuous holding force of the holding mechanism 7.

As described above, the battery cell group 6 is positioned in the exterior body 30 through engagement of the convex part 617 and the concave part 37. Since the temperature control medium flow path 36 is disposed at a higher position that the concave part 37, the temperature control medium flow path 36 is disposed close to the inner surface 33a of the outer side wall 33 and the electrode terminal 602 on the upper portion of the battery cell 60. Therefore, it is possible to efficiently exchange heat between the battery cell 60 and the temperature control medium. Accordingly, the battery device 1 can achieve efficient heat exchange as well as easily position the stacked battery cells 60.

In the case where the protrusion height H2 and the inclination angles of the inclined outer surfaces 617a and 617b of the convex part 617 are fixed, when the width W1 of the tip end surface 617c of the convex part 617 is adjusted, the amount of insertion of the convex part 617 into the concave part 37 is adjusted. The width W1 of the tip end surface 617c is adjusted so that the gap between the lower portion of the battery cell group 6 and the outer side wall 33 at the time when the convex part 617 is inserted into the concave part 37 is the same as the gap S between the upper portion of the battery cell group 6 and the outer side wall 33 defined by the stopper protrusion 616. Thus, the convex part 617 can easily limit the crushing amount of the heat transfer sheet 39 to be the same as the crushing amount of the stopper protrusion 616. Since the heat transfer sheet 39 has a uniform thickness in the upper and lower portions of the battery cell group 6, the heat exchange between the battery cell 60 and the temperature control medium in the temperature control medium flow path 36 is prevented from becoming non-uniform between the upper and lower portions of the battery cell 60.

In addition, when the gap S between the battery cell group 6 and the outer side wall 33 is set by setting the protrusion height H1 of the stopper protrusion 616 and the amount of insertion of the convex part 617 into the concave part 37, the thickness of the heat transfer sheet 39 after being crushed is limited. Since the heat transfer amount of the heat transfer sheet 39 is determined by the thickness, the heat transfer amount of the heat transfer sheet 39 can be easily managed by setting of the gap S.

Since the stopper protrusion 616 and the convex parts 617 and 618 are formed on the separator 61, it is not required to machine the cell case 601 of the battery cell 60. Therefore, the battery cell group 6 having the stopper protrusion 616 and the convex parts 617 and 618 can be easily configured. In particular, since the stopper protrusion 616 and the convex part 617 are disposed on the side of the side surface 60d of the battery cell 60 through the upper side plate part 613 and the lower side plate part 614, it is possible to stably limit the gap S between the side surface 60d of the battery cell 60 and the inner surface 33a of the outer side wall 33.

Also, since the stopper protrusion 616 and the convex parts 617 and 618 are provided on the upper side plate part 613 and the lower side plate part 614, they can be elongated along the lamination direction of the battery cell 60 even if the separator body 611 is thin. Therefore, the positioning of the battery cell 60 and the crushing of the heat transfer sheet 39 can be stably performed.

(Other Embodiments of the Holding Mechanism)

Figure 15:
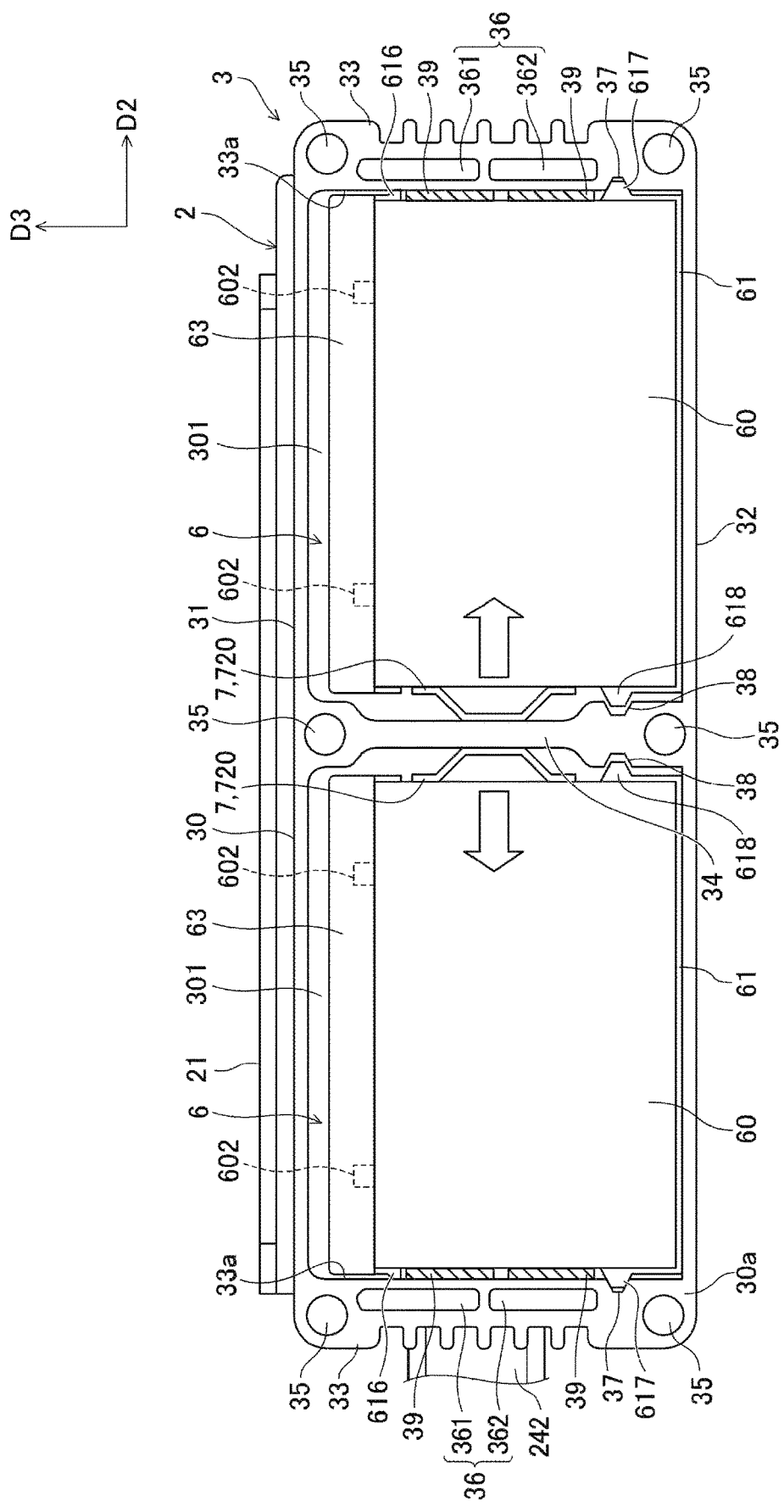
FIG. 15 is a view showing the inside of the exterior body of the battery device, showing another embodiment of the holding mechanism.

The holding mechanism 7 of the disclosure is not necessarily made of the resin 710 and can operate various holding mechanisms. The holding mechanism 7 shown in FIG. 15 is made of a leaf spring 720. The leaf spring 720 is respectively inserted into the gaps between two battery cell groups 6 arranged in parallel, specifically, the gaps between two surfaces of the thin wall part 341 of the middle wall 34 of the exterior body 30 and the battery cell groups 6, over the entire length of the exterior body 30 and the battery cell groups 6 in the length direction. The leaf spring 720 generates a spring reaction force between the middle wall 34 and each of the battery cell groups 6, so as to apply a pressure (the spring reaction force) on each of the battery cell groups 6 in the direction of pressing it toward the two opposite outer side walls 33, with the middle wall 34 interposed therebetween.

Figure 16:
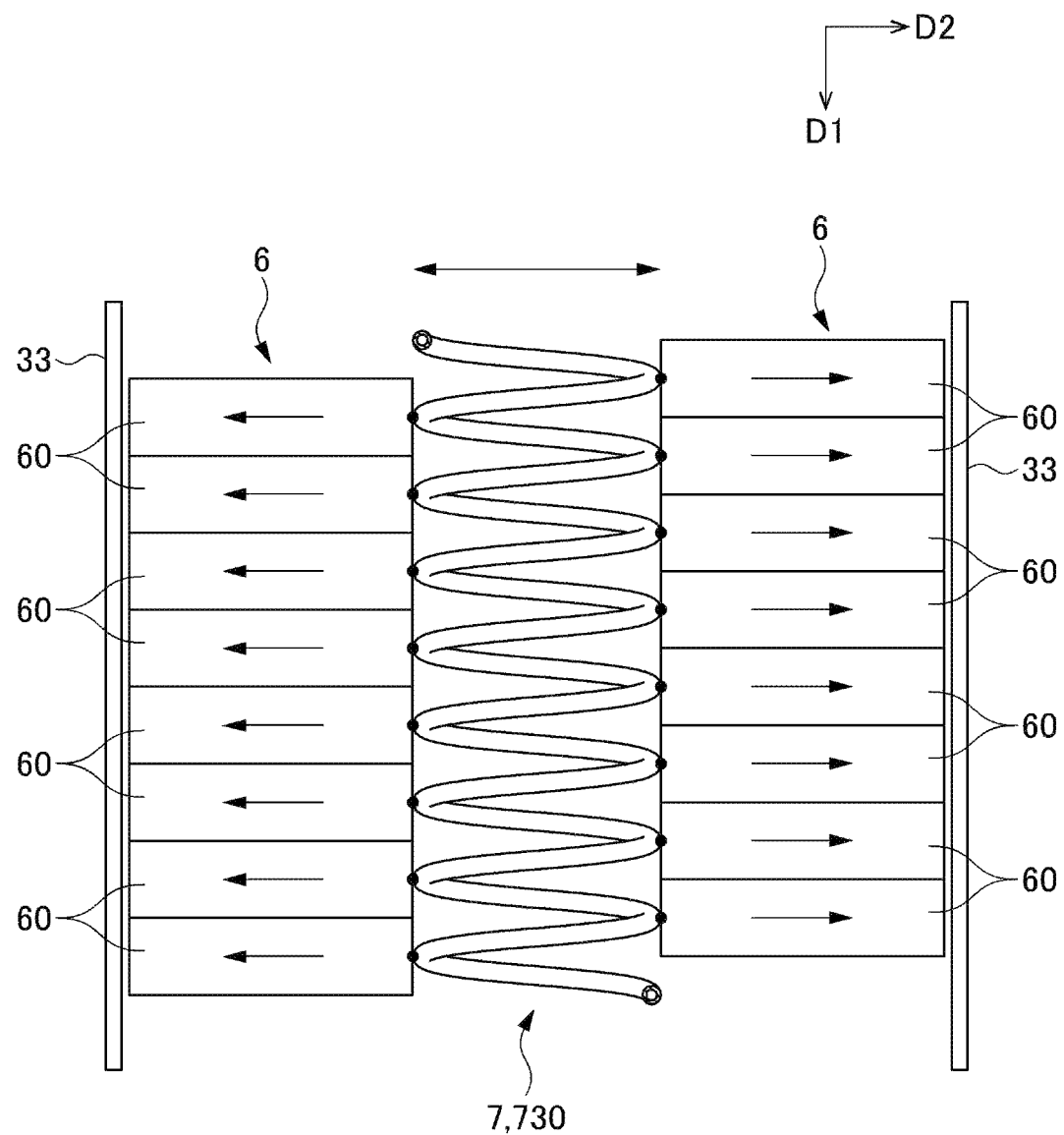
FIG. 16 is a schematic plan view of the inside of the exterior body of the battery device, showing another embodiment of the holding mechanism.

The holding mechanism 7 shown in FIG. 16 is made of an elastic coil 730. The coil 730 is disposed between two battery cell groups 6 so that the axial direction of the coil 730 is along the lamination direction of the battery cell 60. The pitch of the coil 730 is approximately the same as the pitch of each battery cell 60 of the two battery cell groups 6 in the lamination direction. Here, the middle wall 34 of the exterior body 30 is omitted. Further, illustration of the separator 61 between the battery cells 60 adjacent to each other in the lamination direction is omitted.

After being disposed between the two battery cell groups 6, one end of the coil 730 is fixed and the other end is rotationally displaced in the direction opposite to the winding direction of the coil 730 so as to elastically expand the diameter of the coil 730. Thus, the coil 730 can apply a pressure on each of the battery cell groups 6 in the direction of pressing them toward the two opposite outer side walls 33. At this time, the coil 730 is in contact with each battery cell 60 of each battery cell group 6 to apply the pressure individually on the battery cell 60.

Figure 17:
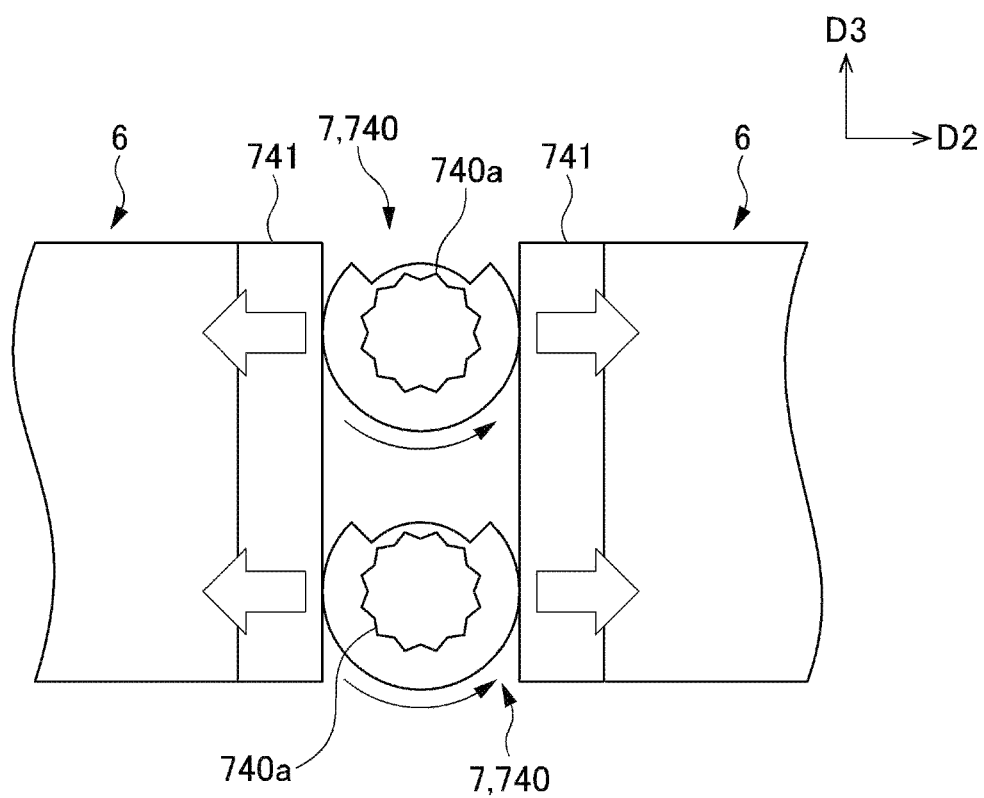
FIG. 17 is a schematic view showing the main parts of the battery device, showing another embodiment of the holding mechanism.

The holding mechanism 7 shown in FIG. 17 is made of a cam member 740. The cam member 740 is made of a rigid body such as aluminum, an aluminum alloy or the like. The axial direction (the rotation center) of the cam member 740 extends along the length direction of the exterior body 30. The cam member 740 has a cross-sectional shape having a radius that continuously changes (increases) from the rotation center with respect to the rotation direction. Two cam members 740 are disposed along the height direction between the two battery cell groups 6. In this case, the exterior body 30 does not have the middle wall 34, either. An insulating pressing plate 741 is interposed between the cam members 740 and the battery cell groups 6 to prevent damage to the battery cells 60 due to the movement of the cam members 740 and to insulate between the cam members 740 and the battery cells 60.

The cam member 740 is inserted between the battery cell groups 6 in a state where the radius of the cam member 740 along the pressing direction (the direction along the direction D2) of the battery cell groups 6 is reduced. When the cam member 740 is rotated from this state, as shown in FIG. 17, the radius of the cam member 740 along the pressing direction of the battery cell group 6 gradually increases. Thus, the battery cell groups 6 are pressed by the outer circumferential surfaces of the cam members 740 and pressed in opposite directions. The rotational displacement position of the cam member 740 is maintained, for example, by providing an appropriate fixing member (not shown) for the cam member 740 on the end surface 30a of the exterior body 30.

Figure 18:
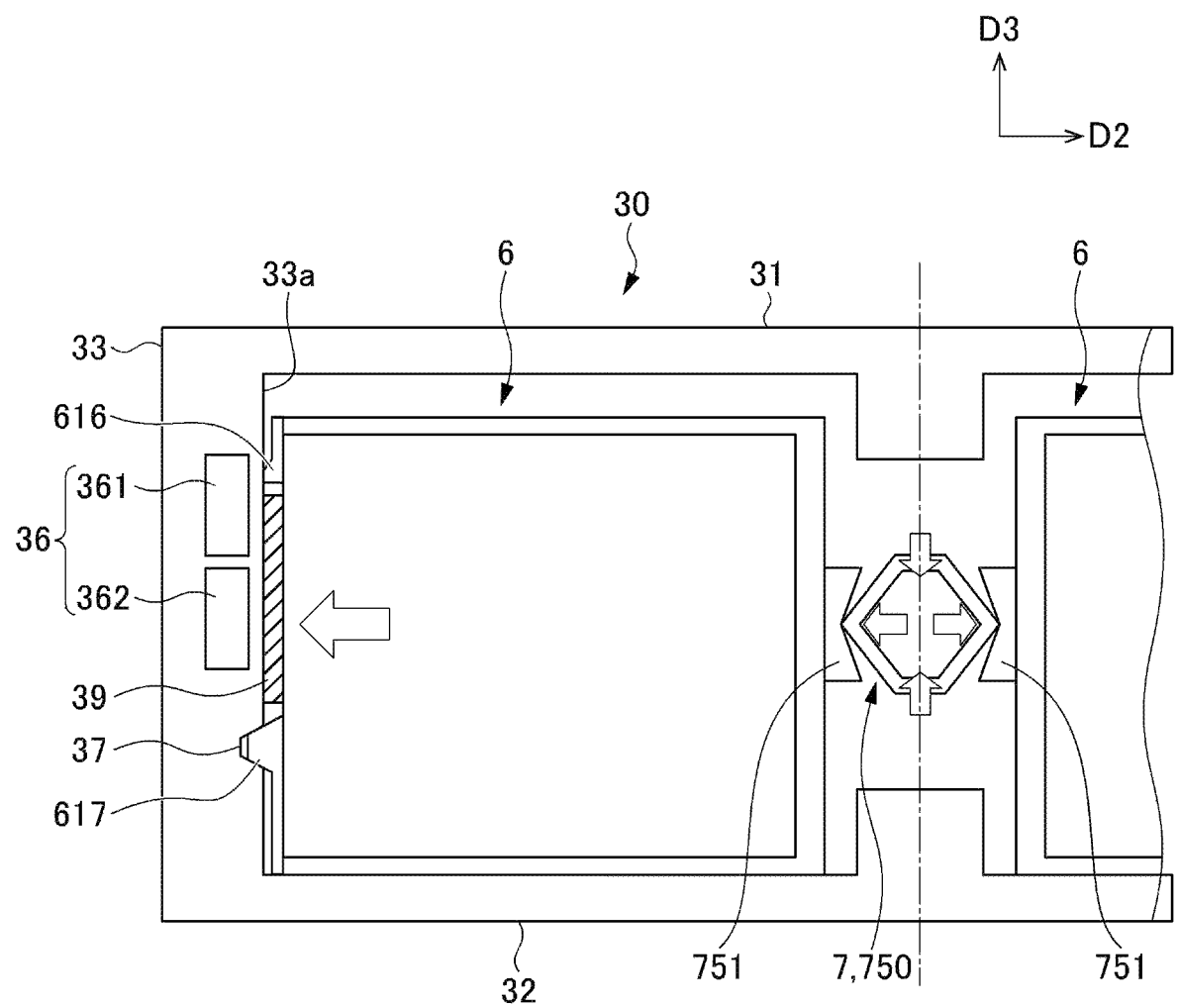
FIG. 18 is a schematic view showing the inside of the exterior body of the battery device, showing another embodiment of the holding mechanism.

The holding mechanism 7 shown in FIG. 18 is made of a pressing member 750 that is made of a plastically deformable metal such as aluminum, an aluminum alloy or the like. The pressing member 750 is formed, for example, in a hexagonal cylindrical shape and extends along the length direction of the exterior body 30, and is disposed between two battery cell groups 6 in the exterior body 30. Between the pressing member 750 and the battery cell groups 6, a contact member 751 is interposed for preventing deformation due to contact with the pressing member 750. In this case, the exterior body 30 does not have the middle wall 34, either.

The pressing member 750 inserted between the battery cell groups 6 is caulked from the vertical direction using an appropriate caulking jig (not shown), so as to be crushed and plastically deformed, as indicated by the arrow in FIG. 18. As a result, the pressing member 750 is expanded in width and applies a pressure on the battery cell groups 6 via the contact members 751 in the direction of pressing them to the outer side walls 33. Since the width-expanded state of the pressing member 750 is maintained after the plastic deformation, the pressing member 750 can easily apply a stable pressing pressure on the battery cell groups 6.

Figure 19A:
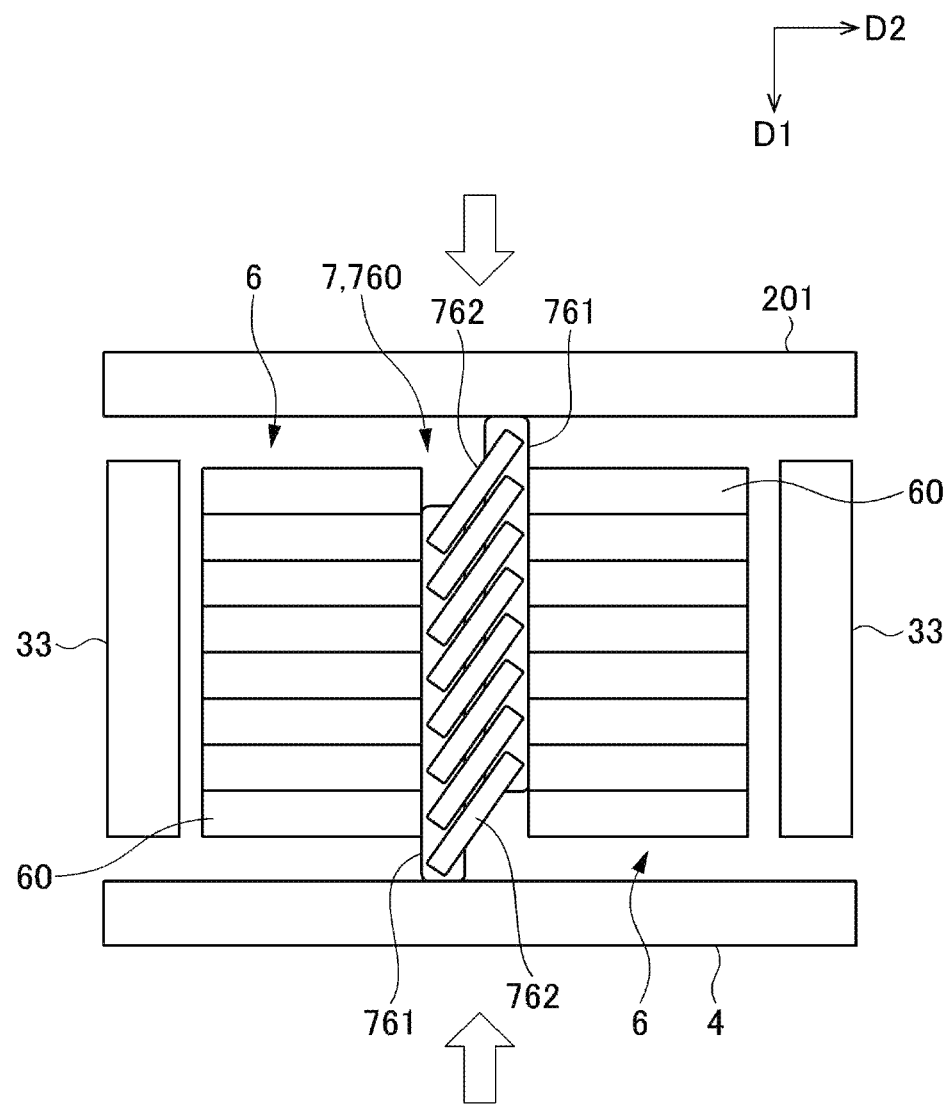
FIG. 19A is a schematic plan view of the main parts of the battery device according to another embodiment of the holding mechanism, and shows a state of the holding mechanism before the pressure in the pressing direction is generated.
Figure 19B:
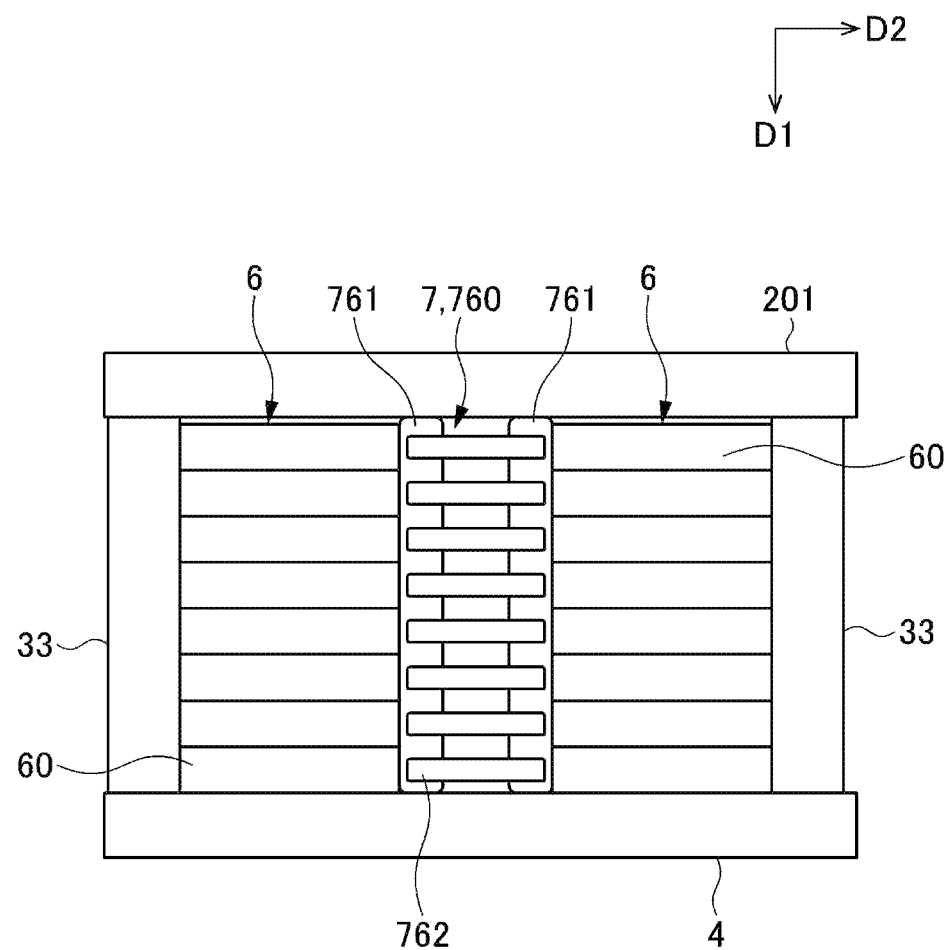
FIG. 19B is a schematic plan view of the main parts of the battery device according to another embodiment of the holding mechanism, and shows a state of the holding mechanism when the pressing pressure is generated.

The holding mechanism 7 shown in FIG. 19A and FIG. 19B is made of a link mechanism 760. The link mechanism 760 includes two parallel support plates 761 arranged along the lamination direction of the battery cells 60, and a plurality of parallel connection members 762 connecting between the two support plates 761. Two ends of the connection member 762 are rotatably connected to the support plates 761 respectively. In this case, the exterior body 30 does not have the middle wall 34, either.

The link mechanism 760 brings the two support plates 761 close to each other and is inserted between the battery cell groups 6 with the width dimension of the link mechanism 760 reduced, as shown in FIG. 19A. Thereafter, when the two support plates 761 are clamped by the side wall part 201 and the end plate 4 and move relatively in the direction opposite to the lamination direction of the battery cells 60, as indicated by the arrow, the interval between the support plates 761 is increased, and as shown in FIG. 19B, the link mechanism 760 applies a pressure on the battery cell groups 6 in the direction of pressing them toward the outer side walls 33.

Figure 20:
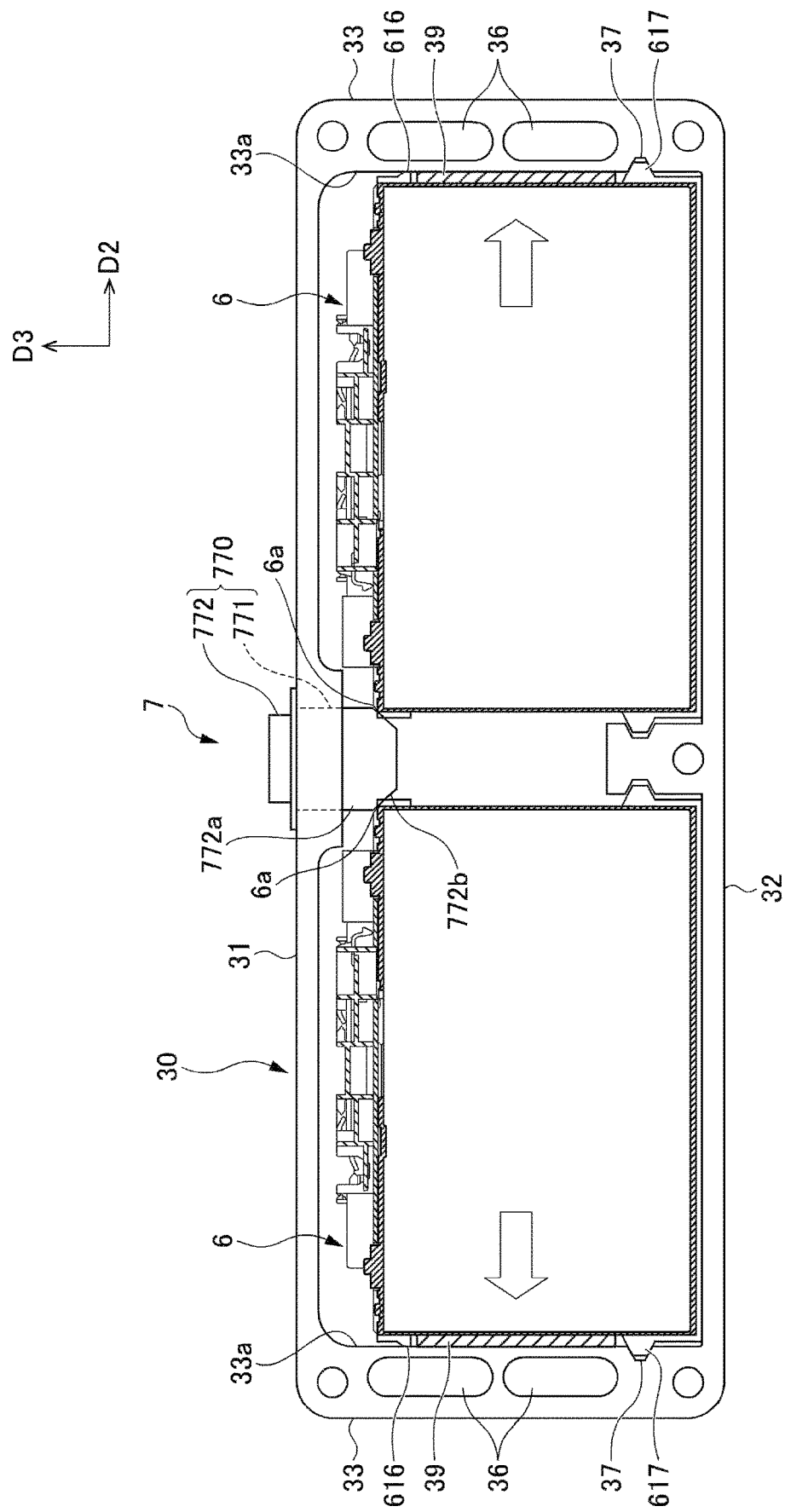
FIG. 20 is a view showing the inside of the exterior body of the battery device according to another embodiment of the holding mechanism.

The holding mechanism 7 shown in FIG. 20 is made of a wedge mechanism 770 that has a through hole 771 penetrating the exterior body 30, and a wedge member 772 inserted into the through hole 771. The through hole 771 is formed on the upper side wall 31 of the exterior body 30 at a position between the two battery cell groups 6. In this case, the exterior body 30 does not have the middle wall 34, either. The tip end of a cylindrical shaft 772a of the wedge member 772 is tapered to have a bevel 772b. The wedge member 772 has a male thread on the outer circumferential surface of the shaft 772a and is configured to be screwed to the female thread formed in the through hole 771.

When the wedge member 772 is screwed into the through hole 771, the bevel 772b at the tip end of the shaft 772a comes into contact with the corners 6a of the battery cell groups 6. When the wedge member 772 is further rotated and pressed in, the bevel 772b presses the corners 6a of the battery cell groups 6 and presses the two battery cell groups 6 along its inclined surface to the outer side walls 33 disposed in opposite directions. Therefore, by simply inserting the wedge member 772 into the through hole 771 from the outside of the exterior body 30, the pressing pressure can be easily applied on the battery cell groups 6 in the exterior body 30. In addition, since the wedge member 772 is screwed into the through hole 771, the amount of pressing the battery cell groups 6 can be easily adjusted by adjusting the rotation amount of the wedge member 772.

Figure 21:
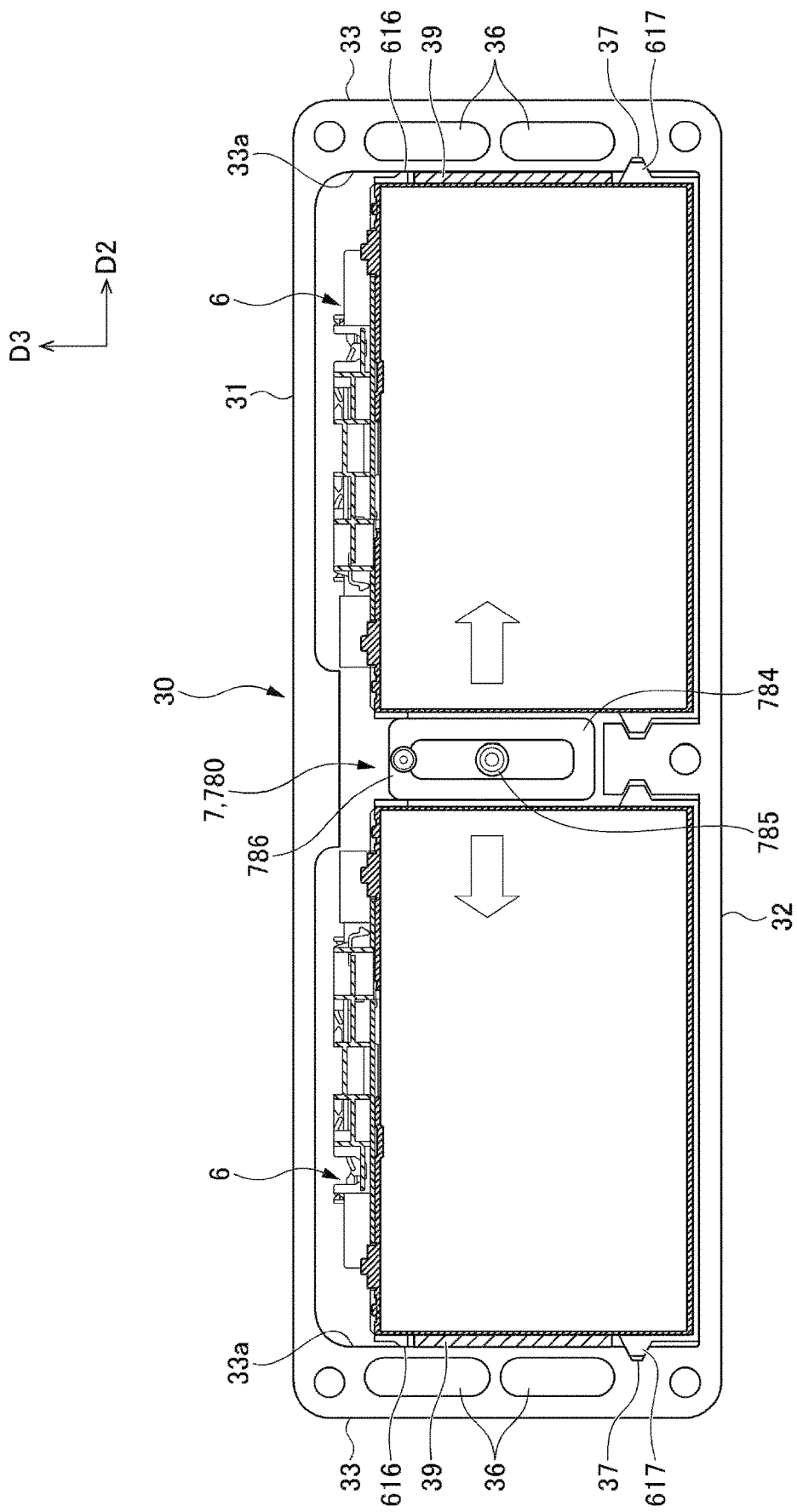
FIG. 21 is a view showing the inside of the exterior body of the battery device according to another embodiment of the holding mechanism.
Figure 22:
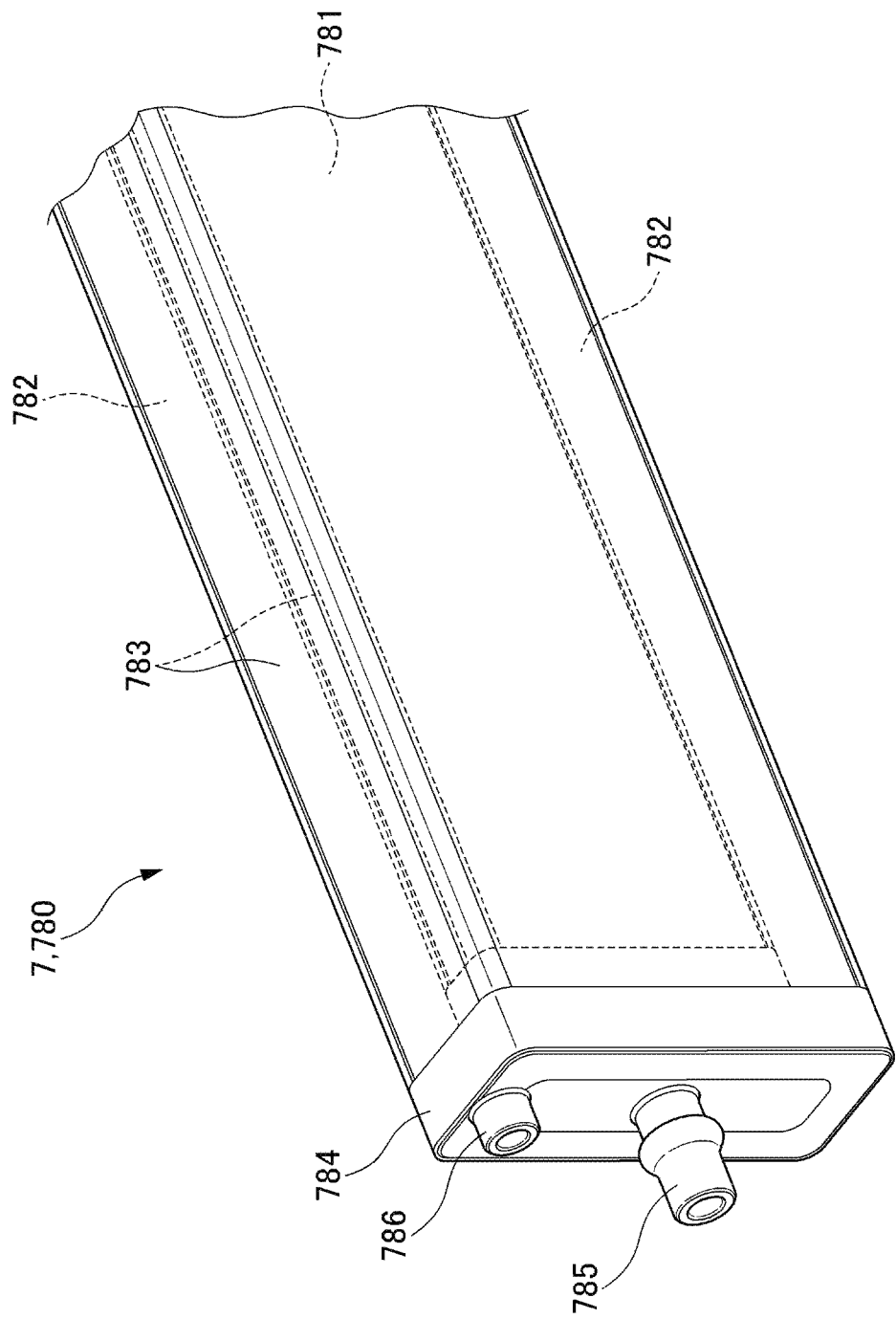
FIG. 22 is a perspective view showing the main parts of the holding mechanism shown in FIG. 21.

The holding mechanism 7 shown in FIG. 21 is made of a filling member 780. The filling member 780 has a substantially rectangular parallelepiped shape and extends over the entire length of the battery cell 60 in the lamination direction, and is disposed between the two battery cell groups 6 in the exterior body 30. In this case, the exterior body 30 does not have the middle wall 34, either. As shown in FIG. 22, the filling member 780 has a gas filling layer 781 to be filled with a gas such as air, and a resin filling layer 782 to be filled with a curable resin such as an epoxy resin. The resin filling layer 782 is disposed around the gas filling layer 781 and surrounds the gas filling layer 781. As compared with the gas filling layer 781 disposed in the center, the resin filling layer 782 on the outer periphery is formed in the shape of a thin layer. The gas filling layer 781 and the resin filling layer 782 are made of, for example, a bag-like flexible laminate film 783 having a double structure.

One end of the filling member 780 has an end portion 784 that is formed of a hard material such as metal or a hard resin. The end portion 784 has a first joint part 785 for gas filling in communication with the inside of the gas filling layer 781, and a second joint part 786 for resin filling in communication with the inside of the resin filling layer 782. The first joint part 785 and the second joint part 786 protrude from the end portion 784, but they may be female joint parts that do not protrude from the end portion 784.

The filling member 780 is inserted between the battery cell groups 6 in the exterior body 30 in a contracted state where the gas filling layer 781 and the resin filling layer 782 are not substantially filled with any of the gas and the curable resin. Since the filling member 780 is in the contracted state, the insertion process can be performed easily. Thereafter, gas is injected from the first joint part 785 to fill the gas filling layer 781 first. Thus, the gas filling layer 781 expands and applies a pressure on the battery cell groups 6 in the direction of pressing them toward the outer side walls 33. However, since the pressure at this time is generated by the gas in the gas filling layer 781 which is compressible, it is not sufficient to stably hold the battery cell groups 6 on the outer side walls 33.

Next, the curable resin is injected from the second joint part 786 to fill the resin filling layer 782. Thus, the resin filling layer 782 expands and further applies a pressure on the battery cell groups 6 in the direction of pressing them toward the outer side walls 33. Then, when the curable resin in the resin filling layer 782 is cured, the pressure that the filling member 780 applies on the battery cell groups 6 in the pressing direction is maintained. Thereby, the filling member 780 can stably hold the battery cell groups 6 on the outer side walls 33.

[Other Embodiments of the Battery Device]

In the battery device 1 shown in the above embodiment, two battery cell mounting parts 3 are disposed with the I/F box 2 interposed therebetween. However, the battery cell mounting parts 3 may be disposed only on one side of the I/F box 2.

Moreover, although each of the embodiments described above illustrates that the battery device 1 has a cylindrical exterior body 30, the exterior body 30 is not necessarily cylindrical. The exterior body that houses the battery cell group 6 may have, for example, a box shape (bathtub shape) having a removable lid on the upper portion. In that case, the battery cell group 6 can be configured in the exterior body by separately housing the battery cells 60 in the exterior body from above the exterior body that is open with the lid removed. The concave part 38 of the middle wall 34 can be provided to be engageable with the convex part 618 of the battery cell group 6 from above.

When the box-shaped (bathtub-shaped) exterior body is used, it is also possible to use the holding mechanism 7 described above to press the battery cell group 6 toward the outer side wall of the box-shaped exterior body. By moving the battery cell group 6 toward the outer side wall, the convex part 617 can be engaged with the concave part 37 of the outer side wall in the lateral direction, as in the above embodiment. In this case, for example, the holding mechanism 7 may be disposed from above the box-shaped exterior body, or an opening may be formed in a part of the peripheral wall part of the box-shaped exterior body disposed at two ends of the battery cells 60 in the lamination direction to be used for disposing the holding mechanism 7 into the exterior body.

What is claimed is:

1. A battery device, comprising:
   an exterior body comprising two outer side walls;
   at least one battery cell group housed between the two outer side walls of the exterior body and configured by stacking a plurality of battery cells each having an electrode terminal on an upper portion;
   a temperature control medium flow path embedded inside at least one of the two outer side walls, wherein a temperature control medium for exchanging heat with the battery cells flows in the temperature control medium flow path; and
   a holding mechanism applying a pressure on the battery cell group in a direction of pressing the battery cell group toward the outer side wall provided with the temperature control medium flow path, and holding the battery cell group in the exterior body, wherein the holding mechanism comprises a resin, a leaf spring, an elastic coil, a cam member, a pressing member, a link mechanism, a wedge mechanism or a filling member,
   wherein the battery cell group comprises a convex part, which protrudes toward the outer side wall provided with the temperature control medium flow path, on a lower portion,
   an inner surface of the outer side wall provided with the temperature control medium flow path comprises a concave part, which is engageable with the convex part, at a lower position than the temperature control medium flow path, and
   the battery cell group is held by the holding mechanism in a state of being positioned in the exterior body through engagement of the convex part and the concave part.

2. The battery device according to claim 1, wherein the temperature control medium flow path is provided in each of the two outer side walls,
   a plurality of the battery cell groups are housed in parallel between the two outer side walls of the exterior body, and
   the holding mechanism is disposed between the battery cell groups, and applies a pressure on the battery cell groups in a direction of pulling the battery cell groups away from each other and pressing the battery cell groups toward the two opposite outer side walls, and holds the battery cell groups in the exterior body.

3. The battery device according to claim 1, wherein the exterior body is an extrusion-molded product with a direction along a lamination direction of the battery cells as an extrusion direction.

4. The battery device according to claim 1, wherein a crushable heat transfer sheet is disposed between the outer side wall, to which the battery cell group is pressed, and the battery cell group and at a higher position than the convex part,
   the battery cell group comprises a stopper protrusion, which is at a higher position than the heat transfer sheet and sets a gap between the outer side wall, to which the battery cell group is pressed, and the battery cell group, and
   the heat transfer sheet is crushed between the outer side wall, to which the battery cell group is pressed, and the battery cell group, and is clamped in the gap set by the stopper protrusion.

5. The battery device according to claim 4, wherein the battery cell group comprises a separator that insulates between the battery cells adjacent to each other in the lamination direction, and
   the convex part and the stopper protrusion are provided on the separator.

6. The battery device according to claim 5, wherein the separator comprises an upper side plate part disposed on an upper portion of a side surface of the battery cell and a lower side plate part disposed on a lower portion,
   the stopper protrusion is provided on the upper side plate part of the separator, and
   the convex part is provided on the lower side plate part of the separator.

7. The battery device according to claim 1, wherein the convex part has a trapezoid shape that has two inclined outer surfaces arranged one above the other and one tip end surface between the two inclined outer surfaces, and
   the concave part has two inclined inner surfaces to be respectively in contact with the two inclined outer surfaces of the convex part.

8. The battery device according to claim 2, wherein the exterior body is an extrusion-molded product with a direction along a lamination direction of the battery cells as an extrusion direction.

9. The battery device according to claim 2, wherein a crushable heat transfer sheet is disposed between the outer side wall, to which the battery cell group is pressed, and the battery cell group and at a higher position than the convex part, the battery cell group comprises a stopper protrusion, which is at a higher position than the heat transfer sheet and sets a gap between the outer side wall, to which the battery cell group is pressed, and the battery cell group, and the heat transfer sheet is crushed between the outer side wall, to which the battery cell group is pressed, and the battery cell group, and is clamped in the gap set by the stopper protrusion.

10. The battery device according to claim 3, wherein a crushable heat transfer sheet is disposed between the outer side wall, to which the battery cell group is pressed, and the battery cell group and at a higher position than the convex part, the battery cell group comprises a stopper protrusion, which is at a higher position than the heat transfer sheet and sets a gap between the outer side wall, to which the battery cell group is pressed, and the battery cell group, and the heat transfer sheet is crushed between the outer side wall, to which the battery cell group is pressed, and the battery cell group, and is clamped in the gap set by the stopper protrusion.

11. The battery device according to claim 2, wherein the convex part has a trapezoid shape that has two inclined outer surfaces arranged one above the other and one tip end surface between the two inclined outer surfaces, and the concave part has two inclined inner surfaces to be respectively in contact with the two inclined outer surfaces of the convex part.

12. The battery device according to claim 3, wherein the convex part has a trapezoid shape that has two inclined outer surfaces arranged one above the other and one tip end surface between the two inclined outer surfaces, and the concave part has two inclined inner surfaces to be respectively in contact with the two inclined outer surfaces of the convex part.

13. The battery device according to claim 4, wherein the convex part has a trapezoid shape that has two inclined outer surfaces arranged one above the other and one tip end surface between the two inclined outer surfaces, and the concave part has two inclined inner surfaces to be respectively in contact with the two inclined outer surfaces of the convex part.

14. The battery device according to claim 5, wherein the convex part has a trapezoid shape that has two inclined outer surfaces arranged one above the other and one tip end surface between the two inclined outer surfaces, and the concave part has two inclined inner surfaces to be respectively in contact with the two inclined outer surfaces of the convex part.

15. The battery device according to claim 6, wherein the convex part has a trapezoid shape that has two inclined outer surfaces arranged one above the other and one tip end surface between the two inclined outer surfaces, and the concave part has two inclined inner surfaces to be respectively in contact with the two inclined outer surfaces of the convex part.

16. The battery device according to claim 8, wherein a crushable heat transfer sheet is disposed between the outer side wall, to which the battery cell group is pressed, and the battery cell group and at a higher position than the convex part, the battery cell group comprises a stopper protrusion, which is at a higher position than the heat transfer sheet and sets a gap between the outer side wall, to which the battery cell group is pressed, and the battery cell group, and the heat transfer sheet is crushed between the outer side wall, to which the battery cell group is pressed, and the battery cell group, and is clamped in the gap set by the stopper protrusion.

17. The battery device according to claim 9, wherein the battery cell group comprises a separator that insulates between the battery cells adjacent to each other in the lamination direction, and the convex part and the stopper protrusion are provided on the separator.

18. The battery device according to claim 10, wherein the battery cell group comprises a separator that insulates between the battery cells adjacent to each other in the lamination direction, and the convex part and the stopper protrusion are provided on the separator.

19. The battery device according to claim 8, wherein the convex part has a trapezoid shape that has two inclined outer surfaces arranged one above the other and one tip end surface between the two inclined outer surfaces, and the concave part has two inclined inner surfaces to be respectively in contact with the two inclined outer surfaces of the convex part.

20. The battery device according to claim 9, wherein the convex part has a trapezoid shape that has two inclined outer surfaces arranged one above the other and one tip end surface between the two inclined outer surfaces, and the concave part has two inclined inner surfaces to be respectively in contact with the two inclined outer surfaces of the convex part.

* * * * *